US009171289B2

(12) United States Patent
Kraft et al.

(10) Patent No.: US 9,171,289 B2
(45) Date of Patent: Oct. 27, 2015

(54) METHODS AND SYSTEMS FOR PRODUCING, PREVIEWING, AND PUBLISHING A VIDEO PRESS RELEASE OVER AN ELECTRONIC NETWORK

(71) Applicant: SNN, Inc., Los Angeles, CA (US)

(72) Inventors: Sheldon Kraft, Los Angeles, CA (US); Robert Kraft, Los Angeles, CA (US); Lynda Lou Kraft, Los Angeles, CA (US)

(73) Assignee: SNN Incorporated, Culver City, CA (US)

( * ) Notice: Subject to any disclaimer, the term of this patent is extended or adjusted under 35 U.S.C. 154(b) by 0 days.

(21) Appl. No.: 14/628,284

(22) Filed: Feb. 22, 2015

(65) Prior Publication Data
US 2015/0161565 A1    Jun. 11, 2015

Related U.S. Application Data

(63) Continuation-in-part of application No. PCT/US2013/000193, filed on Aug. 24, 2013.

(60) Provisional application No. 61/743,044, filed on Aug. 24, 2012.

(51) Int. Cl.
*G06F 17/22*    (2006.01)
*G06F 17/24*    (2006.01)
(Continued)

(52) U.S. Cl.
CPC ............ *G06Q 10/10* (2013.01); *G06F 17/2247* (2013.01); *G06F 17/24* (2013.01); *G06Q 10/00* (2013.01); *G06Q 50/00* (2013.01); *H04N 7/01* (2013.01)

(58) Field of Classification Search
CPC .............. H04N 21/440218; H04N 21/440263; G06F 17/30011; G06F 17/30893; G06F 17/30766
See application file for complete search history.

(56) References Cited

U.S. PATENT DOCUMENTS 4,498,098 A    2/1985    Stell
5,832,171 A *  11/1998   Heist .................... H04N 9/8233
                                                        386/241
(Continued)

FOREIGN PATENT DOCUMENTS

EP          0601647 A1    6/1994
WO      2012047507 A1    4/2012

OTHER PUBLICATIONS
http://freenuts.com/top-10-websites-to-edit-videos-online-for-free/, published Sep. 25, 2010, pp. 1-9.*
(Continued)

*Primary Examiner* — Scott Baderman
*Assistant Examiner* — Mario M Velez-Lopez
(74) *Attorney, Agent, or Firm* — American Patent Agency PC; Karl P. Dresdner, Jr.; Daniar Hussain

(57) ABSTRACT

The present invention relates to methods and systems for producing, previewing and publishing a video press release ("VPR") over an electronic network. A video press release comprises multimedia information. A software transcoder that performs the function of removing incompatibilities between video file formats and text document file formats for producing, previewing and publishing a VPR is implemented. The present invention assures multimedia compatibility of a VPR across video file formats, web browser formats, computer operating systems, and text file formats by transcoding a video file, as well as compressing, resizing and juxtaposing/transposing the transcoded video file along with a text presentation received from a text file, and presenting the so-produced VPR to Internet audience. The invention operates with a webpage of a secure Internet website so that a single individual for a public or private company or other organizations may generate a video press release instantly and efficiently by an accurate, efficient, and time-sensitive method.

20 Claims, 10 Drawing Sheets

(51) Int. Cl.
*G06Q 50/00* (2012.01)
*H04N 7/01* (2006.01)
*G06Q 10/10* (2012.01)
*G06Q 10/00* (2012.01)

(56) References Cited

U.S. PATENT DOCUMENTS

| | | | | |
|---|---|---|---|---|
| 7,478,170 | B2* | 1/2009 | Ong | G06F 17/30011 |
| | | | | 707/E17.005 |
| 7,925,201 | B2* | 4/2011 | Irvin | G06F 17/30749 |
| | | | | 455/3.01 |
| 8,194,657 | B2 | 6/2012 | Xiong et al. | |
| 8,799,774 | B2* | 8/2014 | Chafy | G06F 17/241 |
| | | | | 715/202 |
| 2004/0001106 | A1* | 1/2004 | Deutscher | G06F 17/30017 |
| | | | | 715/838 |
| 2004/0257434 | A1* | 12/2004 | Davis | H04N 7/147 |
| | | | | 348/14.13 |
| 2005/0094030 | A1 | 5/2005 | Brelay | |
| 2006/0109378 | A1* | 5/2006 | Yang | H04N 5/44513 |
| | | | | 348/465 |
| 2006/0259588 | A1* | 11/2006 | Lerman | G06F 17/30017 |
| | | | | 709/219 |
| 2008/0033815 | A1* | 2/2008 | Choi | G06Q 30/00 |
| | | | | 705/14.54 |
| 2008/0255686 | A1* | 10/2008 | Irvin | G06Q 30/02 |
| | | | | 700/94 |
| 2008/0256109 | A1* | 10/2008 | Irvin | G06F 17/30017 |
| | | | | 1/1 |
| 2009/0119693 | A1* | 5/2009 | Higgins | H04H 20/38 |
| | | | | 725/9 |
| 2009/0177463 | A1* | 7/2009 | Gallagher | G06F 17/30616 |
| | | | | 704/10 |
| 2009/0228572 | A1 | 9/2009 | Wall et al. | |
| 2010/0094728 | A1* | 4/2010 | Denning | G06Q 30/02 |
| | | | | 705/26.1 |
| 2010/0122165 | A1 | 5/2010 | Uberti | |
| 2011/0197237 | A1 | 8/2011 | Turner | |
| 2011/0225482 | A1 | 9/2011 | Chan et al. | |
| 2012/0173628 | A1* | 7/2012 | Briere | G06Q 10/10 |
| | | | | 709/204 |
| 2012/0316888 | A1* | 12/2012 | Stacey | G06Q 10/10 |
| | | | | 705/1.1 |
| 2013/0022955 | A1* | 1/2013 | Lang | G09B 7/02 |
| | | | | 434/362 |

OTHER PUBLICATIONS http://any-video-converter.com/add-srt-subtitle-to-output-video.php, Jan. 4, 2012, pp. 1-5.*
http://www.makeuseof.com/tag/watch-folders-convert-video-files-dropfolders-handbrake, published Aug. 24, 2010, pp. 1-5.*
http://any-video-converter.com/products/for_video_ultimate/, available Jan. 3, 2012, pp. 1-13.*
http://www.kylegilman.net/2011/01/18/video-embed-thumbnail-generator-wordpress-plugin, Jun. 3, 2012, pp. 1-26.*
http://www.bigasoft.com/articles/how-to-compress-video-mkv-mpeg-avi-mp4-mov-wmv.html , Jun. 24, 2012, pp. 1-4.*
PCT International Search Report, PCT/US2013/000193, published Aug. 24, 2013, First Inventor—Kraft, Sheldon.

* cited by examiner

METHODS AND SYSTEMS FOR PRODUCING, PREVIEWING, AND PUBLISHING A VIDEO PRESS RELEASE OVER AN ELECTRONIC NETWORK

CROSS-REFERENCE TO RELATED APPLICATIONS

This application is a CIP application ("bypass CIP") filed under 35 USC 111(a) and claims the benefit of an earlier filed application under 35 USC 120 from International Application No. PCT/US2013/000193, filed on Aug. 24, 2013, and entitled "Methods and Apparatus For Creating And Using A Business Video Press Release," which itself claims the benefit of priority from U.S. Provisional Application with Ser. No. 61/743,044, filed Aug. 24, 2012, and entitled "Methods For Creating And Using A Video Press Release," the entirety of both of which are hereby incorporated by reference herein.

FIELD OF THE INVENTION

The present invention relates to methods and systems for producing, previewing and publishing a video press release over an electronic network. The present invention can fill a need for public companies, private companies, organizations, and the like, for a safe publication of a time-sensitive and a factually-accurate information in a video press release that can be selectively distributed to an Internet audience which needs or requires such information.

BACKGROUND OF THE INVENTION

This section provides background that may be useful in understanding the invention, and does not constitute prior art.

Public companies, private companies, organizations, and the like, have a need to publish time-sensitive and factually-accurate information, selectively to individuals and other entities who need or who require such information. The word "company" can refer to a public company, a private company, an organization, and the like without limitation. It has been the common practice for a company to publish the time-sensitive company information in a selective and factually accurate report as a press release. In some cases, the press release document has needed to be selective in its distribution; and to be received only by its intended recipients by hand, mail, fax or email. If such a controlled selective distribution was not required, then the press release document may have been published in magazines, newspapers, journals, newsletters, brochures, or on the Internet to a large number of recipients. There are technical problems and limitations with a multimedia news release and with a blog that have made them an unsuitable and an unsafe pathway for a dissemination of a press release for a business.

Firstly, there is no guarantee that time-sensitive publishing standards will be followed by the copywriter. The Internet copywriter may violate the critical date and time for the distribution of the multimedia news release. The Internet copywriter, for whatever reason, may circulate a copy of the multimedia news release earlier than has been mandated by the company to some of the intended recipients or to another individual. There are many well-known instances of insider information wherein time-sensitive, factual company information was wrongfully used in a number of ways. Secondly, there is the possibility that the copywriter may relax controls in place over the distribution of the multimedia news release to its intended recipients. The copywriter may distribute the multimedia news release to less than all of its designated recipients or to a non-intended recipient. Thirdly, there is the possibility that the copywriter will commit accidental errors due to inattention that alter the accuracy of the facts reported by the multimedia news release. Fourthly, there is the possibility, albeit remote that the copywriter will intentionally commit an act of fraud and insert error(s) in the multimedia news release.

An additional problem with the process of a multimedia news release is the limited formatting control over the media product it creates and publishes. Furthermore, prior to publication of a multimedia news release, the process has the problem that the multimedia news release does not allow a preview of the precise media product that shall be published. The first viewing of a multimedia news release can only occur after publication of a multimedia news release product.

A blog is a discussion or informational site published on the Internet consisting of discrete entries or posts typically displayed in reverse chronological order with the most recent post appearing first. The discussion or information site is the work of a single individual, a small group, or many authors. Information is in the form of online personal journal entries that self-reflect and comment about events and people and use hyperlinks. The ability of readers to leave comments in an interactive format is an important contribution to the popularity of many blogs. Most blogs are primarily textual, although some focus on art, photographs, videos, music, or audio. To facilitate the posting of content by non-technical users, a specialized content management system of weblog applications supports the authoring, editing, and publishing of blog posts and comments, with special functions for image management, web syndication, and post and comment moderation.

The writing in blogs is a forum for reactive commentary and personal opinions, as would occur in an informal social gathering. Consequently, as a fact source, blogs are biased and publish alleged facts informally. On a blog, a public company, a private company, an organization and the like cannot responsibly, credibly, and properly publish time-sensitive, factual company information in the form of a press release document.

It is against this background, and in order to solve the aforementioned problems, that various embodiments of the present invention were developed.

BRIEF SUMMARY OF THE INVENTION

The present invention in one general embodiment is a method for creating a business video press release in a webpage of a video press release website, the method comprising the steps of: uploading a business video file having a first file format and a business text document file having a second file format to said webpage of said video press release website; formatting said business video file along with said business text document file at said webpage of said video press release website, wherein said step of formatting combines said business video file having said first file format and said business text document file having said second file format to result in a combination file having a third file format, wherein said combination file having said third file format comprises said video press release; and previewing said business video press release at said website, wherein said business video press release comprises said combination file in said third file format, wherein said combination file comprises said formatted business video file and said formatted text document file, wherein (1) said step of formatting and (2) said step of previewing are achieved by using a software transcoder, wherein said software transcoder is coded by a computer program for automatically resolving video file format incompatibility issues, wherein said incompatibility issues emerge in at least one of (a) said step of formatting and (b) the step of previewing, wherein said combination file having said third file format is transcoded and resized to assure compatibility with said webpage of said video press release website, thereby transcoding said business video file into a suitable video format for presentation at said webpage, and juxtaposing or transposing said transcoded video file with said business text to present to an Internet audience said transcoded business video file and said business text side-by-side, wherein said transcoding comprises reformatting, resizing and defining resolution of said business video file, wherein said business video file is selected from a plurality of video file formats, and wherein said incompatibility issues are relevant to at least all of a plurality of web-page formats, a plurality of video playback applications, and a plurality of operating systems.

The method for creating the business video press release in a webpage of a video press release website, can operate using various operating systems, including for example, a WINDOWS operating system, a LINUX operating system, a UNIX operating system, an ANDROID operating system, an APPLE MAC operating system, and an APPLE iOS mobile operating system. In some embodiments of the present invention said method for creating the business video press release in a webpage of a video press release website can be performed using cloud computing and a cloud storage, wherein said business video press release is stored in said cloud storage.

The method for creating the business video press release can use a software transcoder which has a command line interface to accept a computer command, wherein said computer command instructs said software transcoder to receive an incompatible video file format and to convert said incompatible video file format into a compatible video file format.

In some embodiments of the present invention, the method for creating the business video press release can use a software transcoder which further comprises a modified Video Embed & Thumbnail Generator (VETG) comprises media library browser plug-in adapted to embed videos, generate thumbnails, and encode HTML-5 compatible files.

In some embodiments of the present invention, the method for creating the business video press release can use a software transcoder which further comprises a modified FFMPEG plug-in, wherein a FFMPEG plug-in is a software module for transcoding a first type of multimedia data format into a second type of multimedia data format, wherein transcoding is specified in a command line or an interface of said software module.

In some embodiments of the present invention, the method for creating the business video press release in a webpage of a video press release website, can do transcoding of a business video file which further comprises compressing said business video file.

In some embodiments, said method for creating the business video press release in a webpage of a video press release website can select the business video file from a plurality of video file formats which include, for example, an MP4, an M4V, a WMV, a MOV, an MPG, an M2V, a FLV, an AVI, a 3G2, an AAF, a 3GP, a GIF, an ASF, an AVCHD, an AVI, a CAM, a DAT, a DSH, an M1V MPEG-1, am M2V MPEG-2, a FLA, a FLR, a SOL, an M4V, a Matroska, an MPEG-4 ASP, an MPEG-4 AVC, a WRAP, an MNG, a PNG, a JPEG, a QTCH, an MPEG, an MPEG-4 Part 14, an MXF, a ROQ, an Ogg, a SVI, and a SWF.

In yet some other embodiments of the present invention, said method for creating the business video press release in a webpage of a video press release website can also comprise a publishing said business press video press release at said website after said step of previewing completes. Said method for creating the business video press release in a webpage of a video press release website can in some embodiments, include the option, after the step of formatting is stored in a server, that the steps of previewing and publishing be performed at a user selected time, thereby setting up a preferred time and a target audience for a distribution of said video press release. Said method for creating the business video press release can be created to have any conceivable length playback time, including a playback time of between about 5 seconds to about 60 minutes, or to about 120 minutes, or to about 180 minutes, or to about 240 minutes.

The method for creating the business video press release in a webpage of a video press release website need can be conducted by one user to create said business video press release. In some embodiments of the present invention, the method for creating the business video press release in a webpage of a video press release website can be performed using a portable mobile internet device.

In some embodiments of the present invention, said subject matter of the business video press release may comprise any conceivable business subject matter, including for example, one or more of the following: a market awareness, an investor visibility, a new product announcement, a financial reporting, a regulatory compliance, a management change, a SEC filing 10Q, a SEC filing 10K, a SEC filing 8K, a corporate material event, a corporate change, a corporate merger, a corporate acquisition, a legal proceeding, a trade show, a conference, a road show, a new corporate C level hire, a new contract, a newly offered service, a joint venture, a new marketing agreement, a strategic alliance, a new office opening, a corporate expansion, a mention in another person's research report, a research report, a new share issue, a warrant execution, a new funding, a third party related transaction, a clinical trial, a gas well drilling report, an oil well drilling report, a mining report, a regulatory approval, a company announcement, a company update, a company research report, a third party research report, a company investor relation statement, a company public relations statement, an organization announcement, and initial public offering document, a technology advancement, a company-relevant information, and a combination thereof.

The present invention in a second general embodiment is a non-transitory, computer-readable storage medium storing executable instructions, which when executed by a processor, causes the processor to perform a process of creating a business video press release in a client-server environment, the instructions causing the processor to perform the steps of: uploading a business video file having a first file format and a business text document file having a second file format to said webpage of said video press release website; formatting said business video file along with said business text document file at said webpage of said video press release website, wherein said step of formatting combines said business video file having said first file format and said business text document file having said second file format to result in a combination file having a third file format, wherein said combination file having said third file format comprises said video press release; and previewing said business video press release at said website, wherein said business video press release comprises said combination file in said third file format, wherein said combination file comprises said formatted business video file and said formatted text document file, wherein (1)

said step of formatting and (2) said step of previewing are achieved by using a software transcoder, wherein said software transcoder is coded by a computer program for automatically resolving video file format incompatibility issues, wherein said incompatibility issues emerge in at least one of (a) said step of formatting and (b) said step of previewing, wherein said combination file having said third file format is transcoded and resized to assure compatibility with said webpage of said video press release website, thereby transcoding said business video file into a suitable video format for presentation at said webpage, and juxtaposing or transposing said transcoded video file with said business text to present to an Internet audience said transcoded business video file and said business text in any respective positions, including for example, side-by-side, wherein said transcoding comprises reformatting, compressing, resizing and defining resolution of said business video file, wherein said business video file is selected from a plurality of video file formats, and wherein said incompatibility issues are relevant to at least all of a plurality of web-page formats, a plurality of video playback applications, and a plurality of operating systems.

In some embodiments, said computer-readable storage medium storing executable instructions when executed by a processor can cause the processor to perform the step of: (1) formatting and (2) said previewing using a software transcoder which has a command line interface to accept a computer command, so that said computer command instructs said software transcoder to receive an incompatible video file format and to convert said incompatible video file format into a compatible video file format.

In some embodiments of the present invention, said software transcoder can further comprise a modified Video Embed & Thumbnail Generator (VETG), wherein a Video Embed & Thumbnail Generator (VETG) comprises media library browser plug-in adapted to embed videos, generate thumbnails, and encode HTML-5 compatible files.

In some embodiments of the present invention, said software transcoder can further comprise a modified FFMPEG plug-in, wherein a FFMPEG plug-in is a software module for transcoding a first type of multimedia data format into a second type of multimedia data format, wherein transcoding is specified in a command line or an interface of said software module.

In some embodiments of the present invention, said computer-readable storage medium storing executable instructions when executed by a processor can receive and process a business video file, selected from a plurality of video file formats which include, for example, an MP4, an M4V, a WMV, a MOV, an MPG, an M2V, a FLV, an AVI, a 3G2, an AAF, a 3GP, a GIF, an ASF, an AVCHD, an AVI, a CAM, a DAT, a DSH, an M1V MPEG-1, am M2V MPEG-2, a FLA, a FLR, a SOL, an M4V, a Matroska, an MPEG-4 ASP, an MPEG-4 AVC, a WRAP, an MNG, a PNG, a JPEG, a QTCH, an MPEG, an MPEG-4 Part 14, an MXF, a ROQ, an Ogg, a SVI, and a SWF.

In some embodiments of the present invention, said computer-readable storage medium storing executable instructions when executed by a processor can further cause the processor to perform the step of: publishing said business press video press release at said website after said step of previewing. Said computer readable medium storing executable instructions when executed by a processor can further cause the processor to playback a business video press release with any conceivable playback time which include for example, a playback time of between about 5 seconds to about 60 minutes, or to about 120 minutes, or to about 180 minutes, or to about 240 minutes. The computer-readable storage medium storing executable instructions for creating said business video press release can be operated by one user to create said business video press release.

In some embodiments of the present invention, said computer-readable medium storing executable instructions when executed by a processor can further cause the processor to perform the step of: publishing said business press video press release, wherein a subject matter of said business video press release may comprise any business subject matter, including for example, one or more of the following: a market awareness, an investor visibility, a new product announcement, a financial reporting, a regulatory compliance, a management change, a SEC filing 10Q, a SEC filing 10K, a SEC filing 8K, a corporate material event, a corporate change, a corporate merger, a corporate acquisition, a legal proceeding, a trade show, a conference, a road show, a new corporate C level hire, a new contract, a newly offered service, a joint venture, a new marketing agreement, a strategic alliance, a new office opening, a corporate expansion, a mention in another person's research report, a research report, a new share issue, a warrant execution, a new funding, a third party related transaction, a clinical trial, a gas well drilling report, an oil well drilling report, a mining report, a regulatory approval, a company announcement, a company update, a company research report, a third party research report, a company investor relation statement, a company public relations statement, an organization announcement, and initial public offering document, a technology advancement, a company-relevant information, and a combination thereof.

The present invention in a third general embodiment is a system for creating a business video press release, the system comprising: a computing device having a processor, a display, and a first memory; a server comprising a second memory and a data repository; a telecommunications-link between said computing device and said server; and a plurality of computer codes embodied on said memory of said server, said plurality of computer codes which when executed causes said server to execute a process for: establishing a client-server connection between said server and said computing device; uploading a business video file having a first file format and a business text document file having a second file format to said webpage of said video press release website; formatting said business video file along with said business text document file at said webpage of said video press release website, wherein said process of formatting combines said business video file having said first file format and said business text document file having said second file format to result in a combination file having a third file format, wherein said combination file having said third file format comprises said video press release; and previewing said business video press release at said website, wherein said business video press release comprises said combination file in said third file format, wherein said combination file comprises said formatted business video file and said formatted text document file, wherein (1) said process of formatting and (2) said process of previewing are achieved by using a software transcoder, wherein said software transcoder is coded by a computer program for automatically resolving video file format incompatibility issues, wherein said incompatibility issues emerge in at least one of (a) said step of formatting and (b) the step of previewing, wherein said combination file having said third file format is transcoded and resized to assure compatibility with said webpage of said video press release website, thereby transcoding said business video file into a suitable video format for presentation at said webpage, and juxtaposing or transposing said transcoded video file with said business text to present to an Internet audience said transcoded business video file and said business text in any respective positions, including for example, side-by-side, wherein said transcoding comprises reformatting, compressing, resizing and defining resolution of said business video file, wherein said business video file is selected from a plurality of video file formats, and wherein said incompatibility issues are relevant to at least all of a plurality of web-page formats, a plurality of video playback applications, and a plurality of operating systems.

In some embodiments of the present invention, said system for creating said business video press release can operate using various operating systems, including for example, a WINDOWS operating system, a LINUX operating system, a UNIX operating system, an ANDROID operating system, an APPLE MAC operating system, and an APPLE iOS mobile operating system.

In some embodiments of the present invention, said system for creating said business video press release can use a software transcoder which functions with a command line interface to accept a computer command, wherein said computer command instructs said software transcoder to receive an incompatible video file format and to convert said incompatible video file format into a compatible video file format.

In some embodiments of the present invention, said system for creating said business video press release can have a software transcoder which further comprises a modified Video Embed & Thumbnail Generator (VETG), wherein a Video Embed & Thumbnail Generator (VETG) comprises media library browser plug-in adapted to embed videos, generate thumbnails, and encode HTML-5 compatible files.

In some embodiments of the present invention, said system for creating said business video press release can have a software transcoder which further comprises a modified FFMPEG plug-in, wherein a FFMPEG plug-in is a software module for transcoding a first type of multimedia data format into a second type of multimedia data format, wherein transcoding is specified in a command line or an interface of said software module.

In some embodiments of the present invention, said system for creating said business video press release can use a business video file selected from a plurality of video file formats which include for example, an MP4, an M4V, a WMV, a MOV, an MPG, an M2V, a FLV, an AVI, a 3G2, an AAF, a 3GP, a GIF, an ASF, an AVCHD, an AVI, a CAM, a DAT, a DSH, an M1V MPEG-1, am M2V MPEG-2, a FLA, a FLR, a SOL, an M4V, a Matroska, an MPEG-4 ASP, an MPEG-4 AVC, a WRAP, an MNG, a PNG, a JPEG, a QTCH, an MPEG, an MPEG-4 Part 14, an MXF, a ROQ, an Ogg, a SVI, and a SWF.

In some embodiments of the present invention, said system for creating said business video press release, further comprising a process for: publishing said business video press release at said website after said previewing process completes. The system for creating said business video press release, can create a business video press release which has any conceivable playback duration, including for example, a playback time of between about 5 seconds to about 60 minutes, to about 120 minutes, to about 180 minutes, or to about 240 minutes. Said system for creating said business video press release can be operated by one user to create said business video press release.

In some embodiments of the present invention, said system for creating said business video press release, wherein a subject matter of said business video press release comprises: a market awareness, an investor visibility, a new product announcement, a financial reporting, a regulatory compliance, a management change, a SEC filing 10Q, a SEC filing 10K, a SEC filing 8K, a corporate material event, a corporate change, a corporate merger, a corporate acquisition, a legal proceeding, a trade show, a conference, a road show, a new corporate C level hire, a new contract, a newly offered service, a joint venture, a new marketing agreement, a strategic alliance, a new office opening, a corporate expansion, a mention in another person's research report, a research report, a new share issue, a warrant execution, a new funding, a third party related transaction, a clinical trial, a gas well drilling report, an oil well drilling report, a mining report, a regulatory approval, a company announcement, a company update, a company research report, a third party research report, a company investor relation statement, a company public relations statement, an organization announcement, and initial public offering document, a technology advancement, a company-relevant information, and a combination thereof.

The present invention overcomes a number of technical problems regarding the creation and publication of a video press release. For example, the present invention provides methods, processes, and systems for creating a secure, regulatory agency compliant video press release by a single-user and said single user can publish the video press release instantly or on a scheduled basis to a selected audience by controlling the distribution of the business video press release over the Internet. The web page at the website at which the business video press release is created has secure access as the website user can only login if they have a username ID and a password. The ability of a single user to create and publish said video press release can prevent a corruption of the video press release content. Notably, the invention eliminates the risk of reliance on a second individual who might alter the content of the business video press release publication before it is received by its Internet audience. A single user can control the business video press release publication time/date and can limit the business video press release distribution to be its proper audience at a proper time which may be necessary for the user to be in compliance with business publications regulations. Notably, the present invention can automatically create a business video press release using video file(s) and text(s) that could initially be incompatible. Further note that the present invention lets the creator ("user") of the business video press release to preview the business video press release in order to see precisely how the business video press release will appear as a publication on the Internet to its audience. After the preview of the business video press release has shown the business video press release to be satisfactory, then the business video press release can be instantly published or alternatively, precisely scheduled in time for future publication. Conceivably a video press release can be published and delivered over the Internet to its intended audience anywhere in the world, in any written or spoken language.

Other embodiments of the present invention include the systems, computer media, methods, and processes according to which any of the systems, methods, and processes of the present invention may be operated or implemented. Yet other embodiments of the present invention will be apparent from the various embodiments described in the detailed description and shown in the drawings.

BRIEF DESCRIPTION OF THE DRAWINGS

Embodiments of the present invention described herein are exemplary, and not restrictive. Every figure or drawing should be read in accordance to an embodiment of the present invention, but not as the invention as a whole. Embodiments will now be described, by a way of examples, with reference to the accompanying drawings, in which.

DETAILED DESCRIPTION OF THE INVENTION

Figure 1:
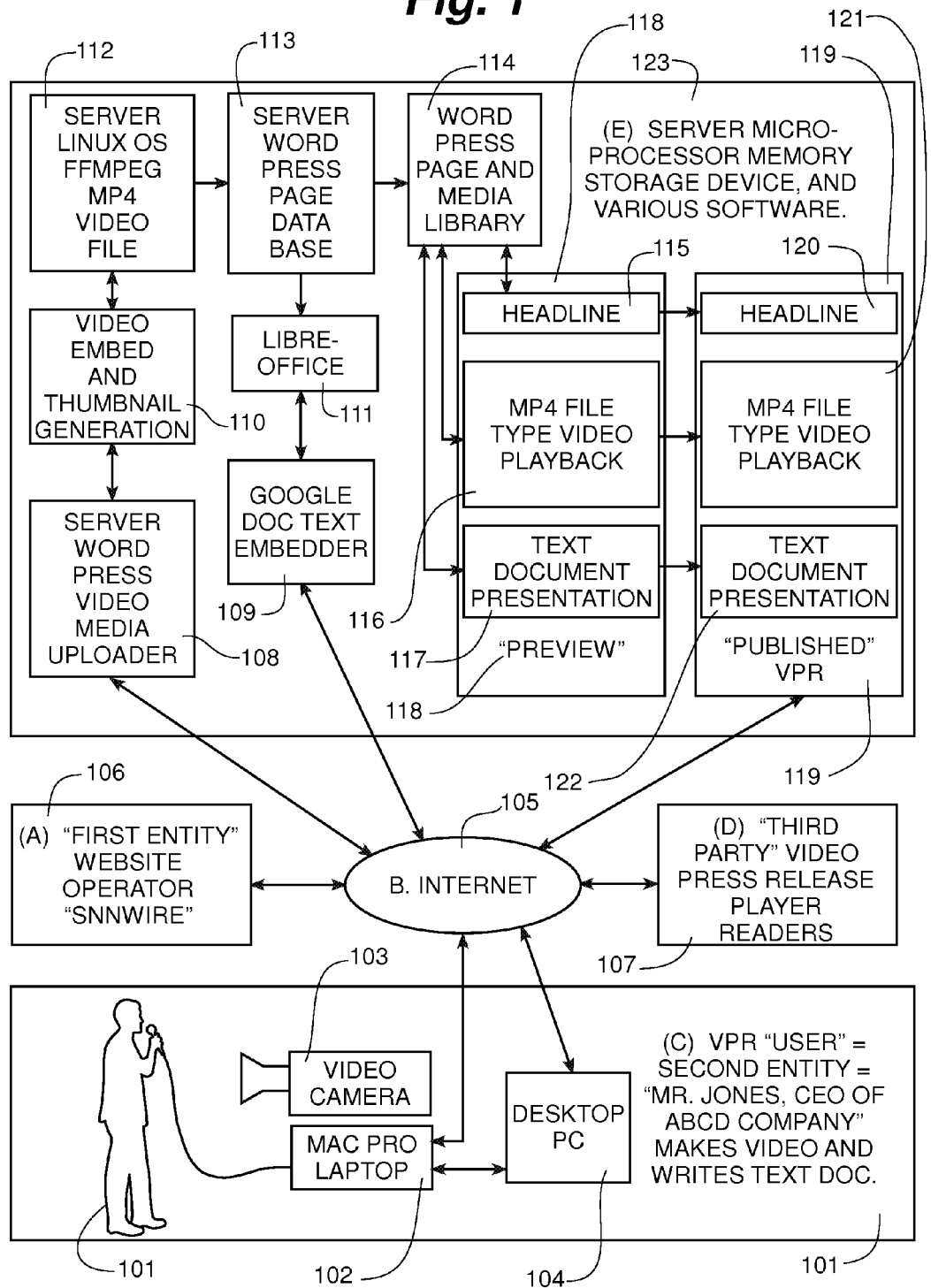
FIG. 1 is a flow chart overview of general methods and systems for the creation of a business video press release.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematic, use case, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, the present invention discloses methods and systems for producing, previewing and publishing a video press release over an electronic network.

A video press release comprises multimedia in the form of news. A multimedia news release includes a combination of text, audio, still images, animation, video, or interactivity content forms. This contrasts with media that use only rudimentary computer displays such as text-only or traditional forms of printed or hand-produced material. A multimedia news release is usually recorded and played, displayed, or accessed by information content processing devices, such as computerized and electronic devices. A multimedia news release may be broadly divided into linear and non-linear categories. Linear active content multimedia progresses often without any navigational control for the viewer such as a cinema presentation. Non-linear content multimedia uses interactivity to control progress.

The three types of a multimedia news release ("MNR") are supported by the present invention: (a) a MNR containing text media; (b) a MNR containing video media; and (c) a MNR containing both text media and video media. The available technology to create a MNR at an HTML webpage requires at least two people: (1) one person is a media provider; and (2) one person is an Internet webpage copywriter. The person who is the media provider creates and uploads the media (text media, or the video media, or both the text media and the video media) to the Internet webpage copywriter. The Internet webpage copywriter embeds and formats the text and/or the video onto an existing HTML webpage. In the process of embedding and formatting of the multimedia information onto an HTML website, the Internet copywriter may delve deeply into the text and video news information; make suggestions; edit a text; and may ask many questions to the media provider. In essence the Internet copywriter has been given complete control of the information. The media provider had to blindly trust the Internet copywriter with the company's information. Confidentiality breaches by the Internet copywriter are possible.

The present invention relates to a webpage at a secure internet website operated by a website operator ("first entity") and relates to methods, processes, and systems operated by the first entity so that a business video press release may be created by a single individual user ("second entity") of the webpage of the secure Internet website. Subsequently, a publication of the created business video press release occurs when the second entity schedules issuance of the business video press release to third parties who playback the business video press release ("business VPR") to view and listen/read the business VPR. The present invention fills a need for public companies, private companies, organizations to be able to safely and accurately create and issue ("publish") a time-sensitive and a factually-accurate business VPR by using a single individual or officer who is responsible for the content.

In one embodiment, the present invention is a method for creating a business video press release in a webpage of a video press release website, the method comprising: uploading a business video file having a first file format and a business text document file having a second file format to said webpage of said video press release website; formatting said business video file along with said business text document file at said webpage of said video press release website, wherein said step of formatting combines said business video file having said first file format and said business text document file having said second file format to result in a combination file having a third file format, wherein said combination file having said third file format comprises said video press release; and previewing said business video press release at said website, wherein said business video press release comprises said combination file in said third file format, wherein said combination file comprises said formatted business video file and said formatted text document file, wherein said step of formatting and said step of previewing are achieved by using a software transcoder, wherein said software transcoder is coded by a computer program for automatically resolving video file format incompatibility issues, wherein said incompatibility issues emerge in at least one of said step of formatting and said step of previewing, wherein said combination file having said third file format comprises the business video file transcoded and resized to assure compatibility with said webpage of said video press release website, thereby transcoding said business video file into a suitable video format for presentation at said webpage, and juxtaposing or transposing said transcoded video file with said business text to present to an Internet audience said transcoded business video file and said business text side-by-side, wherein said transcoding comprises a reformatting, a resizing and modifying are solution of said business video file, wherein said business video file is selected from a plurality of video file formats, and wherein said incompatibility issues are relevant to at least all of a plurality of web-page formats, a plurality of video playback applications, a plurality of end-user devices, and a plurality of operating systems on said end-user devices.

In the aforementioned method, said software transcoder has a command line interface to accept a computer command, wherein said computer command instructs said software transcoder to receive an incompatible video file format and to convert said incompatible video file format into a compatible video file format. Additionally, said software transcoder further comprises a modified Video Embed & Thumbnail Generator (VETG), wherein a Video Embed & Thumbnail Generator (VETG) comprises media library browser plug-in adapted to embed videos, generate thumbnails, and encode HTML-5 compatible files. Additionally, said software transcoder further comprises a modified FFMPEG plug-in, wherein a FFMPEG plug-in is a software module for transcoding a first type of multimedia data format into a second type of multimedia data format, wherein transcoding is specified in a command line or an interface of said software module.

The present invention will now be described in detail in reference to the figures.

FIG. 1 is a diagram showing a general environment of the present invention. In FIG. 1, a single individual or an officer is a user 101, also known as the second entity in FIG. 1. The user 101 creates a business video press release and then can selectively distribute the business VPR to an Internet audience known as the third party 107 in FIG. The third party (audience) observes/reads/views the VPR.

In FIG. 1, bottom box labeled "(C)", a Mr. Jones, CEO of ABCD Company is the named user 101. User 100 is in the process of acquiring a video recording and an audio recording. As user 101, Mr. Jones operates a video camera 103 to make a business video of himself while he speaks into a microphone about a business matter. Mr. Jones might be talking about a business matter ("giving a business speech") with or without a written script. The video file made of user 101 by video camera 103 will have a specific video file format. The video file of user 101 may be stored in a memory device of a Mac Pro laptop computer 102 or on a Desktop personal computer ("PC") 104. Memory devices are known, including DVDs, CDs, VHS video tape, hard drives, RAM chips, servers, and the Internet cloud (the "cloud"). User 101's speech may be stored as an audio sound file with a specific audio file format in a memory device of the Mac Pro laptop computer 102 or the Desktop PC 104. Alternatively user 101's audio file may be converted by using a voice recognition software to create a specific format text document file.

In FIG. 1, either the Mac Pro laptop computer 102 and the Desktop PC 104 is used to instantly or at some time later upload the video file, the sound file, and/or a text file data to the Internet 105. Video press release website operator 106 for example, "SNNWire" who is the "first entity" communicates via the Internet 105 with user 101 who is the "second entity." User 101 can work alone to create a business video press release ("business VPR") at a secure video press release webpage operated by VPR website operator 106 ("first entity"). User 101 schedules the issuance (publication) of the business video press release to a "third party" 107 who can only playback the business video press release when it has become available to watch and read. Mr. Jones can be directed to create the Headline 115, and Format the Video with the written Text Document as a "PREVIEW" 118 which Mr. Jones can see on his computer monitor which displays an HTML file format VPR webpage of the VPR website. When Mr. Jones is satisfied with the appearance of the Preview 118 of the video press release he can instantly make a published video press release 119. See details in the decision tree flow charts of FIGS. 6-8. Mr. Jones has the freedom to make a "selective distribution" of the video press release, namely to decide exactly when, where, and to whom to schedule a distribution of the "ABCD Company" video press release to a Third Party [depicted in Box section (D)].

In general, methods, processes and systems for the present invention with inventive software codes that perform the functions of processing of the video file data from user 101, and that perform the functions of processing the text document file data from user 101, are used to process the video file data and to process the text file data so that the user 101's video and text documents can be seamlessly processed at the webpage of the video press release website operated by the first entity 106 in order to create a business video press release (business VPR) by a single user 101. Processing of video and text data provided by user 101 at each processing step with a software code of the present invention that provides specific functionalities of data processing is used to accomplish specific data processing at each data processing step described below. Such software code is needed to seamlessly create the business video press release. Below described are a sequence of 23 steps in the video file and text document file data processing by a single user 101 using software codes of the present invention that perform specific data processing functions to seamlessly process and create a business video press release from a video file and from a text file document having file formats that are potentially incompatible for creating a business video press release.

The internet 105 serves as a gateway between the user 101 and system (or box 123/box E) of the present invention. The box 123 (or, box E) represents the system components comprising a server, a microprocessor, a memory, a storage means and software relevant to the present invention.

A modified Video Embed & Thumbnail Generator or VTEG (box 108) plug in may be used to embed a video and then generate a thumbnail of the video (box 110). Alternatively, a modified FFMPEG plug in (box 112) may be used to transcode a video file, for example, a mp4 video file transcoded into another acceptable video file format. Acceptability is determined by web browser compatibility or preview capability or playback capability. The video file may already be previously stored in a server or may be supplied via an input device, such as, a memory card, or a camcorder.

The video may be uploaded from any operating system type, such as, LINUX, and the video may be in any video format (box 112). A text file is also used in the upload along with the video file. A text file may be a GOOGLE doc file (box 109) or a LIBRE OFFICE file (box 111). The text file and the video file are uploaded to a database or multimedia server. A database or multimedia server may comprise a WORDPRESS database (box 113), or any other media-file storing database. In one embodiment, a WORD PRESS web page and a media plug-in library (box 114) may be used to facilitate the upload and the storage of video and text files.

A VPR, after being transcoded, transposed and resized, will be previewed, saved, and then published. A VPR has a headline (box 115), a transcoded video (box 116), and a juxtaposed/transposed text document for text presentation (box 117). A preview of the VPR is initiated by clicking a "PREVIEW" button (box 118). This preview can be saved or immediately published. A published VPR is identical to the previewed VPR. A published VPR has an identical headline (box 120), an identical transcoded video (box 121), and an identical text document presentation (box 122). A preview of the VPR may be generated in one device, while a publication of the VPR may be rendered to a different device located at a different location at a different date or time.

Figure 2:
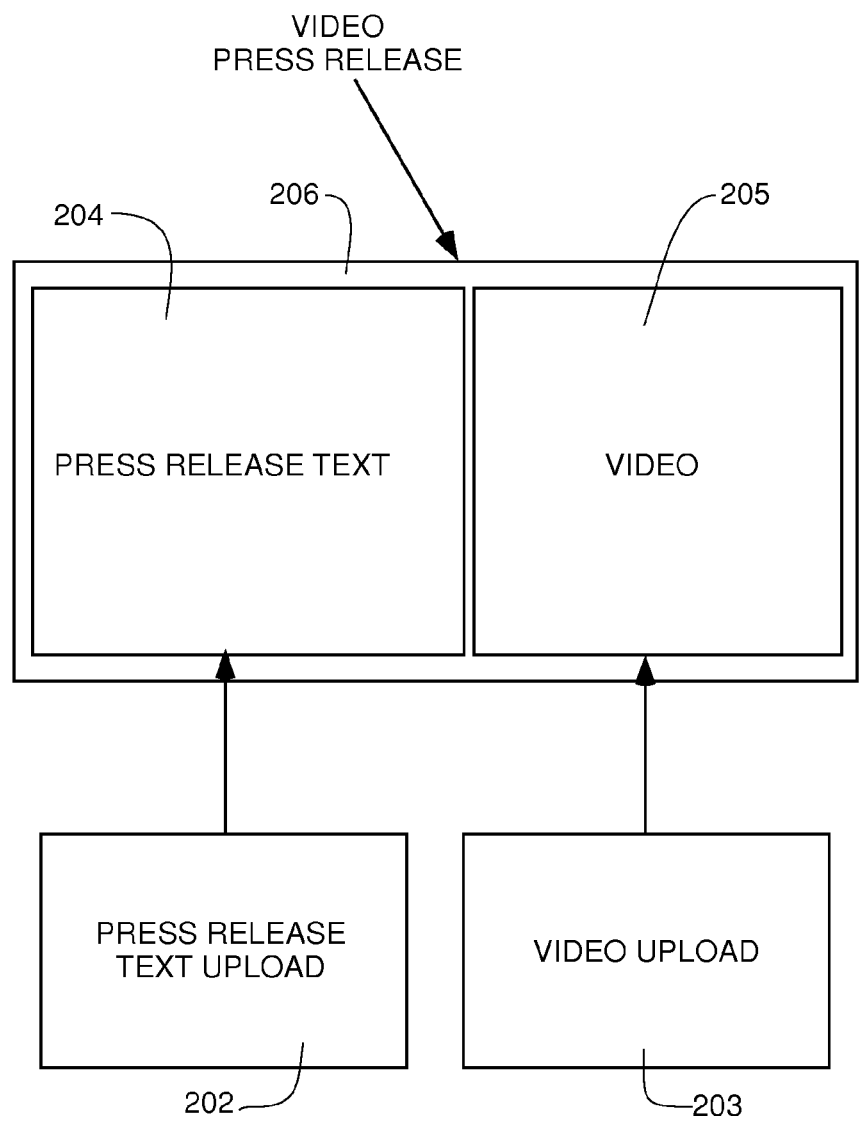
FIG. 2 is a generalized overview diagram depicting one embodiment for creating a business video press release.

FIG. 2 is a symbolic diagram depicting a method for creating a video press release 206. The diagram symbolically depicts uploading a video 203 to the website; uploading a text of a press release 202 to the website; and combining said video and said text at the website. On the right side of the diagram an arrow symbolizes uploading the press release onto the right side 205 of the video press release 206 while the left side of the diagram an arrow symbolizes positioning the video of the press release onto the left side 204 of the video press release. The video upload 203 and the press release upload 202 may occur in any order including simultaneously.

Figure 3:
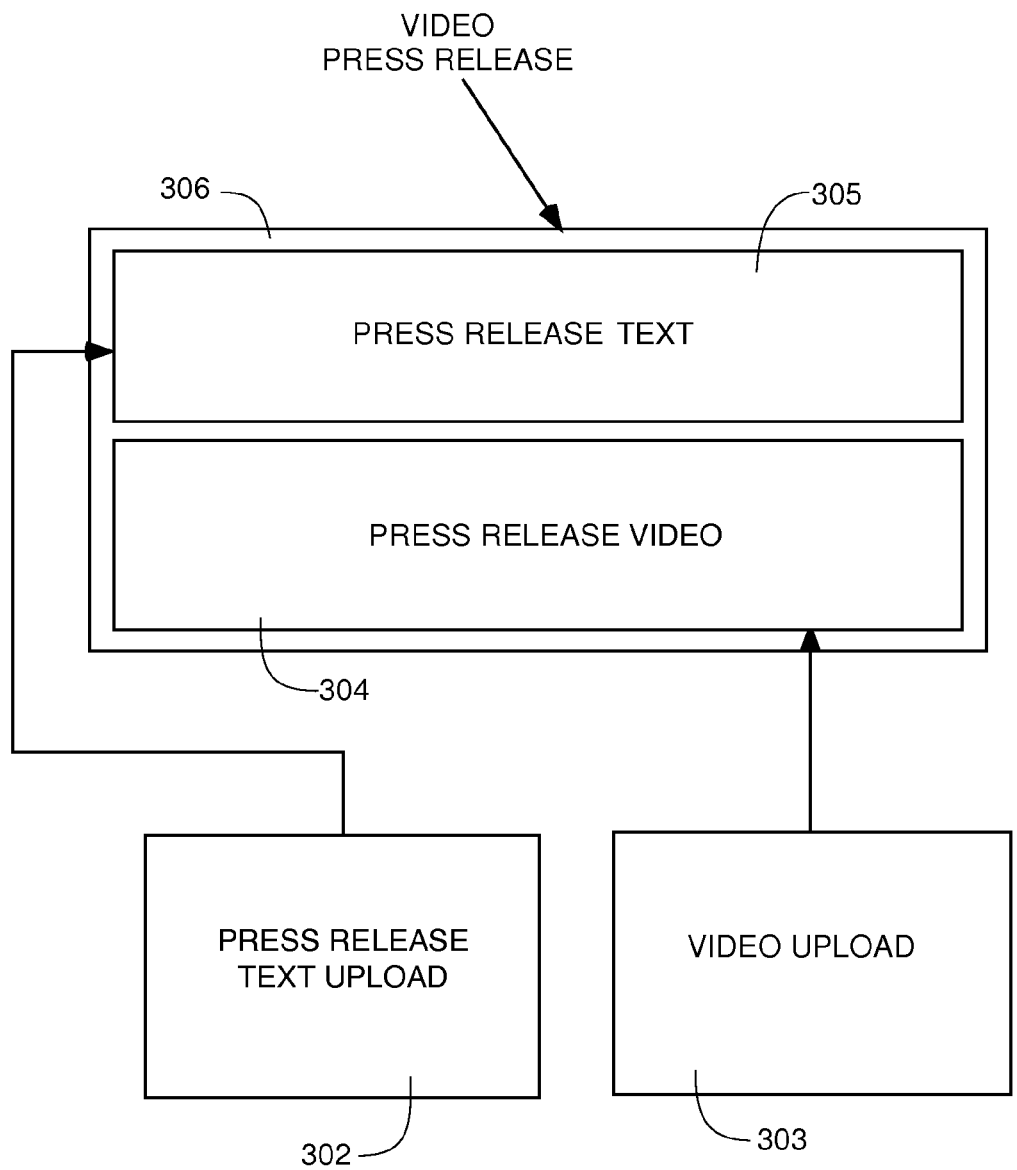
FIG. 3 is a generalized overview diagram depicting one embodiment for creating a video press release, which may be a user generated video press release.

FIG. 3 is a symbolic diagram depicting a method for creating a video press release 306. The diagram symbolically depicts uploading a video 303 to the website; uploading a text of a press release 302 to the website; and combining said video and said text at the website. The press release is uploaded to position the written text of the press release to a location 305 which is above the video position 304 in the video press release 306. The video upload 303 and the press release upload 302 may occur in any order including simultaneously.

Figure 4:
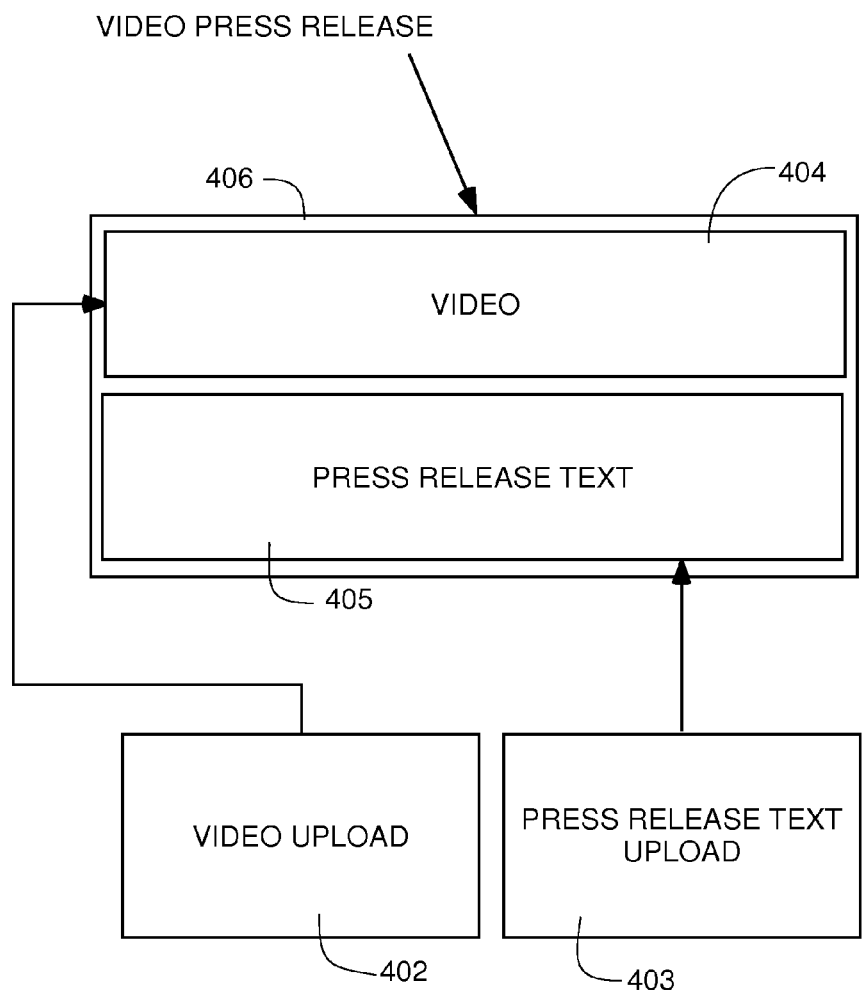
FIG. 4 is a generalized overview diagram depicting one embodiment for creating a video press release, which may be a user generated video press release.

FIG. 4 is a symbolic diagram depicting a method for creating a video press release 406. The diagram symbolically depicts uploading a video 402 to the website; uploading a text of a press release 403 to the website; and combining said video and said text at the website. The press release is uploaded to position the written text of the press release at location 405 which below the video location 404 in the video press release. The video upload 402 and the press release upload 403 may occur in any order including simultaneously.

Figure 5:
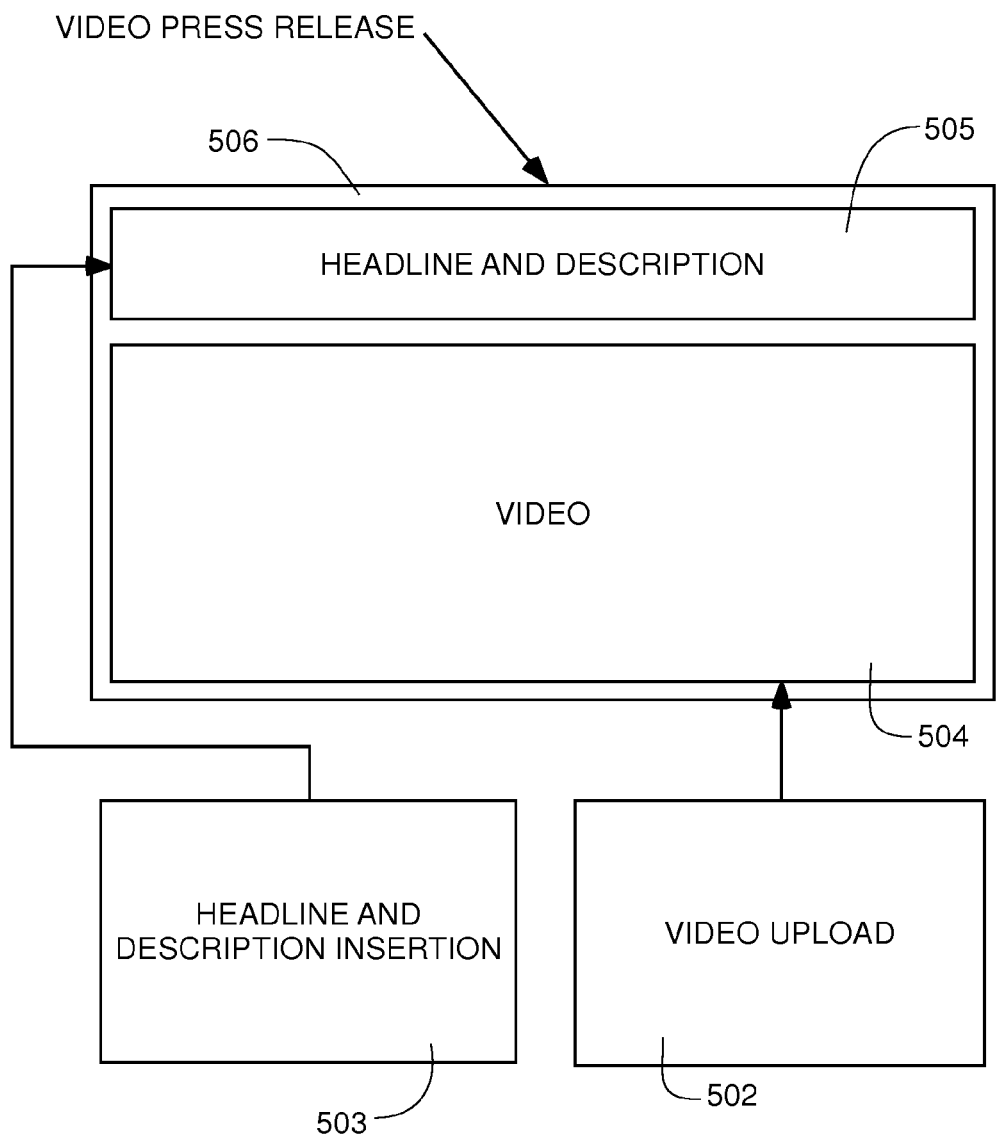
FIG. 5 is a generalized overview diagram depicting one embodiment for creating a business video press release, wherein a video is uploaded without uploading a text.

FIG. 5 is a symbolic diagram depicting a method for creating a video press release 506. The diagram symbolically depicts uploading a video 502 to the website without uploading a text; but including a headline and a written description 503; and thereby creating a video press release 506. The video press release 506 comprises a headline and description 505, and a video 504. To the template to become the video press release for the headline and the written description 503 may be included before or after uploading the video 502. In one embodiment, the video 504 is a transcoded video. The video 502 is an original video, which when uploaded is transcoded, and transposed with the headline and description 503. The video press release 506 comprises the transcoded, transposed, and resized video, along with the headline and the written description.

Illustrative Steps for Practicing the Present Invention in One Embodiment

Below is a description of some embodiments comprising illustrative steps for practicing the invention.

Figure 9:
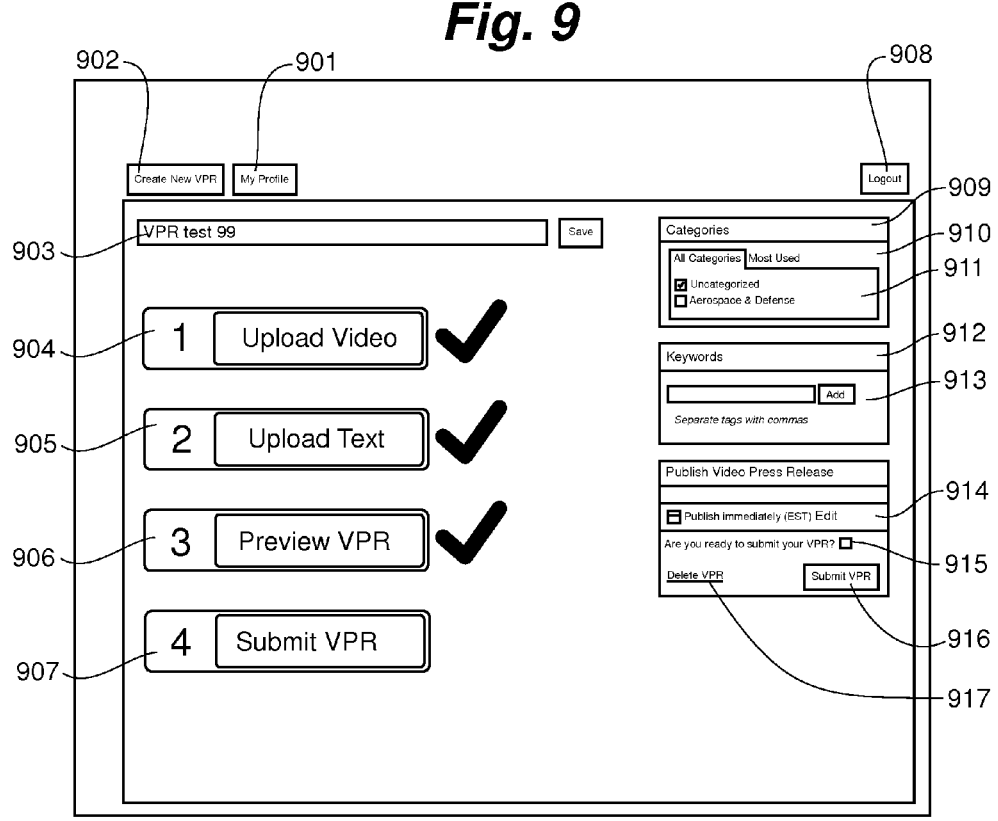
FIG. 9 is an example screenshot of a video press release submission area that can be seen by a user when creating a video press release on a secure webpage at a secure video press release website.

Step 1: At the web page, the user goes to "My Profile" tab.
Step 2: The User 101 clicks "Create VPR".
Step 3a: A software code that performs the function of redirecting user to a VPR submission area is used to redirect the user to a VPR submission area.
Step 3b: In the VPR submission area, a software code that performs the function of managing input data content and the function of providing a template system is used to manage input data content and provide a template system in a content management system. Each VPR data input is a VPR submission that is stored in memory by the VPR website as a "post".
Step 3c: In the VPR submission area, a software code that performs the function of storing general information related to input data "post" is used to store information related to the input data. Such general information will include for example, a title, a text content, an image, a category, a keyword, and a publishing status of the VPR submission.
Step 3d: In the VPR submission area, a software code that performs the function of combining the VPR video input data and text input data is used to combine the VPR video input data and text input data.
Step 3e: In the VPR submission area, a software code that performs the function of storing the VPR video input data and text input data in memory is used to store the VPR video input data and the text input data in memory.
Step 3f: In the VPR submission area, a software code that performs the function of responding to user commands is used to respond to the user's commands. FIG. 9 which is an example screenshot of the VPR submission area displayed on a webpage of a VPR website.
Step 4: In the VPR submission area, the user enters the title of the VPR on a page and clicks "Save". A software code that performs the function of saving and refreshing the page with the title is used to saving and refreshing the page with the title.
Step 5: In the VPR submission area, the user clicks "Upload Video". A software code that performs the function of opening a pop-up window is used to open a pop-up window. The pop-up window that has a software code that performs the function of uploading a video file is used to upload the video file.
Step 5a: In the VPR submission area, a software code that performs the function of automatically attaching the uploaded video file to information related to the video file is used to automatically attach the uploaded video file to the information related to the uploaded video file.
Step 5b: In the VPR submission area, a software code that performs the function of correcting a browser incompatibility is used to correct browser incompatibility.
Step 5c: In the VPR submission area, a software code that performs the function of video conversion to accept video file types is used to insure the VPR submission area accepts all video file types.
Step 5d: In the VPR submission area, a software code that performs the function of correcting any converted video file types to be capable of playback on a selected playback platform is used to correct converted video file to be able to playback on a selected playback platform. A list of contemplated accepted video file types are disclosed in the written description of the invention. Some example accepted video file types include fly, f4v, mp4, mov, m4v, ogv, ogg, and webm.
Step 5e: In the VPR submission area, a software code that performs the function of transposing a video file after the video file has been uploaded, is used if necessary, to transpose the uploaded video file to an mp4 video file.
Step 5f: In the VPR submission area, a software code that performs the function of resizing a video file after the video file has been uploaded, is used if necessary, to resize the uploaded video file to an mp4 video file.
Step 5g: For some embodiments of the present invention, a software code that performs the function of both transposing and resizing video file types to display these video file type more efficiently in a web browser is used to both transpose and resize video file types mp4, m4v, wmv, mov, mpg, m2v, fly, avi, 3gp, and 3g2 in order to display these video file type more efficiently in a web browser.

Step 5*h*: In the VPR submission area, a software code that performs the function of converting a video file after the video file has been uploaded, is used if necessary, to convert the uploaded video file to an mp4 video file.

Step 5*i*: In the VPR submission area, a software code is used to produce an audio/video codec library for handling the audio input data and the video input data.

Step 5*j*: In the VPR submission area, a software code is used to produce an audio/video container mux and demux library for handling the audio input data and the video input data.

Step 5*k*: In the VPR submission area, a software code is used to provide a command line interface to accept a wide range of video input types. A list of contemplated accepted video file types are disclosed in the written description of the invention. Some example accepted video file types include mp4, m4v, wmv, mov, mpg, m2v, fly, avi, 3gp, and 3g2.

Step 5*l*: In the VPR submission area, a software code is used to provide a specific, custom command line configuration for each type of video file encoding.

Figure 10:
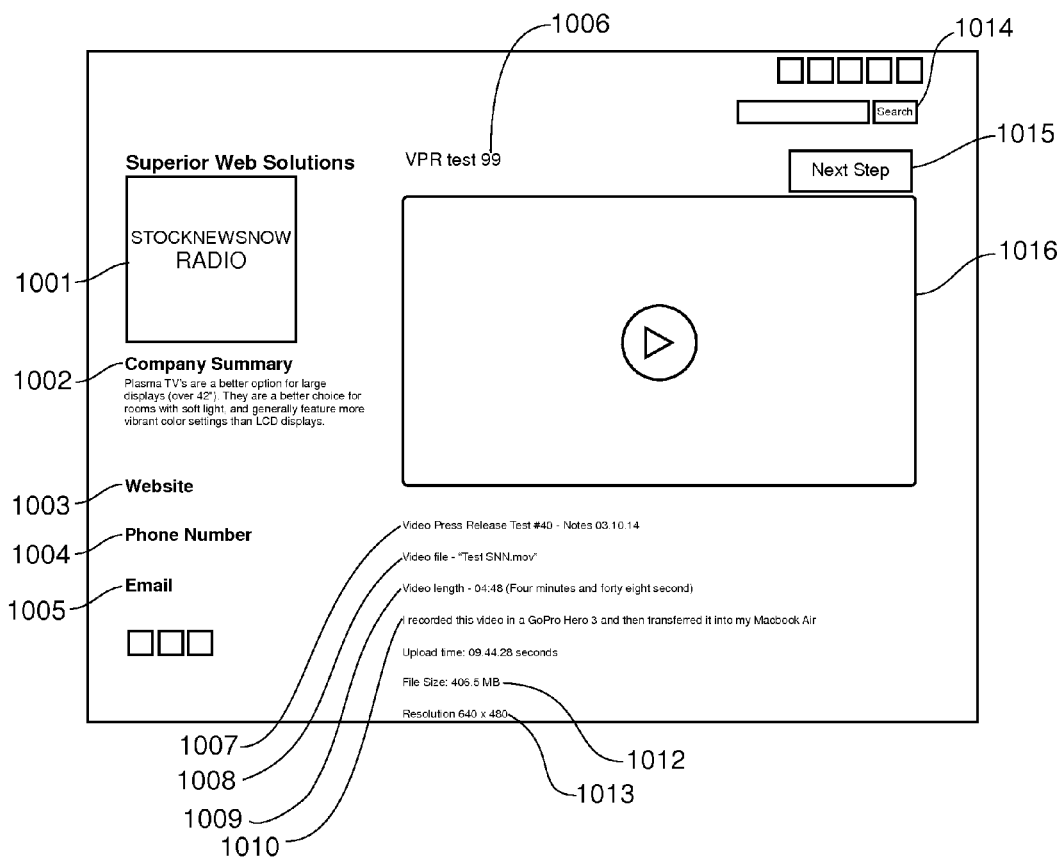
FIG. 10 is an example screenshot of a video press release preview layout that can be seen by a user when creating a video press release on a secure webpage at a secure video press release website.

Step 5*m*: In the VPR submission area, a software code that performs the function of storing the video code in an "excerpt" field of the input data "post" is used to display the video code in an "excerpt" field on the front-end of the website page ("webpage"). FIG. 10 is an example screenshot of the VPR submission area of a VPR webpage with an "excerpt" field displaying the video input data code.

Step 6: User may drag/drop a video onto this screen, or find the video file on their computer. In the VPR submission area, a software code that performs the function during the video file upload process of notifying the user of the video upload progress and estimated time remaining is used to notify the user of the progress in the video upload progress and estimated time remaining that is needed for uploading the user's video file.

Step 7: Once the video file has been uploaded, a software code that performs the function of instructing the user to select a thumbnail for their video is used to instruct the user to select a thumbnail for their video. A software code that performs the function of inserting the selected thumbnail image of the uploaded video into the input data "post", is used to insert the selected thumbnail image of the uploaded video into the input data "post". A software code that performs the function of automatically saving to memory a user's file uploads at the VPR submission area is used for auto-saving uploaded user files at the VPR webpage. User is redirected to the main VPR submission area which is detailed in the FIG. 9 screenshot. A software code that performs the function of check marking the Upload Video button when user's upload has been saved to memory is used to show user that the video file upload(s) have been completed successfully.

Step 8: User then clicks Upload Text, which opens a pop-up window. In the VPR submission area, a dialog window which allows the user to upload a Microsoft Word, or other text, document.

Step 8*a*: In the VPR submission area, a software code that performs the function of taking a Word document and converting it to an HTML text file in a clean way without formatting errors by removing code that impairs the formatting, and by applying custom formatting is used for creating a clean HTML text layout from an uploaded Microsoft Word document.

Step 8*b*: In the VPR submission area, a software code that performs the functions of: storing the HTML text in the "primary content" text field of the "post"; saving the HTML text page, and refreshing the HTML text page displayed in the VPR submission area is used to store the HTML text in the "primary content" text field of the "post"; save the HTML text page, and refresh the HTML text page displayed in the VPR submission area.

Step 9: In the VPR submission area, a software code that performs the function of uploading a Microsoft Word Document of a .doc or a .docx file types, is used by the user when user clicks "choose file" to upload the Microsoft Word Document to the page.

Step 10: User clicks "Insert" in the VPR submission area and this activates a software code that performs the function of inserting the word document which is used to insert the Word document onto the page.

Step 11: In the VPR submission area, a software code that performs the function of: saving the draft VPR page; refreshing the draft VPR page; and putting a check mark beside "Upload Text" in the VPR submission area is used to save the draft VPR page; refresh the draft VPR page; and put a check mark beside "Upload Text" in the VPR submission area.

Step 12: A software code that performs the function of providing a preview in the VPR submission area is used when the user clicks "Preview VPR".

Step 13: A software code that performs the function of taking the user to a page on the "front-end" of the website for allowing the user to view a "VPR Preview" of exactly how the VPR will look when the VPR is published, is used to take the user to a page on the "front-end" of the website to allow the user to view a "Preview" of exactly how the VPR will look when the VPR is published. FIG. 10 is a screenshot example of the front-end of the website with a test video file VPR No. 99.

Step 13*a*: A software code that performs the function of providing a VPR "front-end" design with the values stored for: (1) the VPR Title, VPR Video, VPR text content; and (2) VPR subscriber company's information [which the company may have previously filled out at a different point in time and which could include Company Name, Company Logo, Company Summary, Website, Phone Number, Email, and for example, Social Media links: Facebook, Twitter, and LinkedIn] is used to provide the VPR subscriber with a detailed "Preview" of the draft VPR that can include the Video Press Release information details and subscriber company's information details. In FIG. 1, the VPR subscriber is the "second entity" depicted in the schematic flowchart.

Step 14: A software code that performs the function of allowing a preview of the draft VPR by playing the VPR video and by reading the VPR text is used to preview the draft VPR by the user when needed. The software code that performs the function of allowing the user to click "Next Step" once the user is satisfied with the previewed draft VPR, is used by the user to indicate that the user is satisfied with the draft VPR.

Step 15: A software code that performs the function of redirecting the user back to the VPR submission area for: changing the video; changing the text; or continuing VPR work, is used to redirect the user back to the VPR submission area where the user can elect to change the video, can elect to change the text, or can elect to continue work on the VPR. See FIG. 9 for a screenshot an example VPR submission area appearance.

Step 16: In the VPR submission area, a software code that performs the function of selecting relevant VPR categories from a checkbox list, is used by the user to select relevant VPR categories from a checkbox list.

Step 17: In the VPR submission area, a software code that performs the function of allowing typing in or selecting relevant keywords for a VPR in a text field, is used by a user to type in or select relevant keywords for their VPR in a text field. The software code that performs the function of a text field auto-complete which includes all keywords previously used by any company user on the website is used to perform a text field auto-complete which includes all keywords previously used by any company user on the website.

Step 18: In the VPR submission area, a software code that performs the function of allowing the user immediate, or scheduled (by date and by time) publishing of the VPR, is used to permit the user to publish immediately, or to schedule (by date and by time) for the VPR publication.

Step 19: In the VPR submission area, a software code that performs the function of clicking the confirmation checkbox for submitting user's VPR for an immediate or a scheduled publication, is used so that the user can click the confirmation checkbox and submit user's VPR for immediate or scheduled publication.

Step 20: After the VPR is submitted for publication, then in the VPR submission area, a software code that performs the function of redirecting the user to the Checkout Area to process their payment is used to redirect the user to the Checkout Area to process their payment.

Step 20a: In the Checkout Area, a software code that performs the function of a check out process with customizing of the Checkout Area design, layout, and products is used to perform the checkout process in a customized design layout and products. A software code that performs the function of using a custom-coded checkout logic is used to enforce a minimum purchase amount.

Step 21: A software code that performs the function of activating the VPR and its distribution information after user has paid and finished the checkout process, is used so that the VPR is activated and the distribution information is sent out.

Step 22: A software code that performs the function of allowing a user to create Company profiles and edit a company's information by going to the "My Profile" tab and clicking "Edit Profile" is used so that the company profile can be created and edited as needed by the user.

Step 23: A software code that performs the function of taking the user to a page for their editing is used to allow the user to perform editing of their Email, First Name, Last Name, Password, Company Name, Company Logo, Short Company Description, Company Phone, Mobile Phone, Job Title, Company Website, Stock Chart URL, Facebook URL, Twitter URL, and LinkedIn URL. The software codes that perform these functionalities are used to modulate the functionalities of software and video data file processing and text data file processing in FIG. 1 numbered 108 to 123.

Illustrative Steps Summary:

Provide ID Name and Password—After the issuer has signed up and paid for use of the video press release on SNNWire, the issuer's first step is to create a video press release. Next is to sign in using the credentials that he/she created for their use. Once successfully logged in, the SNNWire home page will refresh indicating; now logged in. At the refreshed home page the issuer will maneuver a mouse cursor over the "My Profile" button, and click "Create New VPR"

Enter headline/Title of VPR—After clicking "Create New VPR", an issuer will be redirected to the VPR Media Room to create their VPR. The first action an issuer will do is type in or "copy and paste" the headline or title of their Video Press.

Upload Video—After entering their headline, the issuer will upload their video file. Once they click, "Upload Video", a pop-up will come onto the issuer's screen that will show the user's "Media Library", which will have past user-generated videos, an option to "Upload File", and an option for "webcam recording". If the issuer has uploaded their video prior to this time, the issuer can simply highlight the video in their media library, choose a thumbnail and click "insert into post". If their video is not in their "media library", the issuer will click "upload file", click "select file" and search their computer for their video file. Once the video file has been uploaded, the issuer will select a thumbnail and click "insert into post". Once the issuer wants to create their video, they will click "webcam recording." In order to do this, the issuer's computer will need to have video recording capabilities. Once the user's computer matches this requirement, the issuer will click a marked "red button" to signal "record", and once finished, they can replay their video to see if it is acceptable, or user may re-record their video. Once the user is satisfied with their video recording, they will choose a thumbnail and click "insert into post."

Upload Text—Once the video is uploaded, the issuer will click "Upload Text". When they click the button, a pop-up will appear on the issuer's screen. This pop-up directs the issuer to click "choose file'. Once clicked the issuer will find their text document on their computer and double-click it and then the issuer will click, "Insert into post". Preview VPR, Modify Video/Text—Once their text document is uploaded, the issuer will have the opportunity to preview their video press release on the HTML web page that was set up using hypertext to set up to do the job of formatting video files with text document files.

If the video press release is satisfactory, the user will click the "next step" button on the top right hand corner of the screen to return the issuer to the VPR Media Room.

Detail Data Entry: Categories and Tags—Once the issuer returns to the VPR Media Room, they must fill out the search categories and tags. This is for search engine purposes, both on the SNNWire.com website and search engines, i.e., Google, Yahoo, etc. For categories, the user will need to check the box for the industry and sector of their company. The user will then type in the tags or keywords or phrases that have to do with their video press release.

Scheduling—Once the issuer is finished entering data, the issuer can schedule the video press release to be published. The issuer will be able to choose a date, time and time zone, or choose to check the box titled, "As Soon As Possible".

Confirm VPR is ready to be published—Once the user has scheduled their video press release publication, their video press release is ready to be submitted for publication. The issuer will click the button titled, "Submit". After clicking "Submit", a pop-up will show on the screen that states, "Are you sure?" with "yes" and "cancel" options. If the user clicks cancel, they will stay in the VPR Media Room. If they click "yes", the user will move on to the next step.

Distribution Selection Menu—Once the user clicks, "yes", they will be redirected to the distribution selection menu. Once at the distribution selection menu pages, the issuer will select from a list of distribution options, for instance, media outlets or targeted database of investors. The issuer will make their selection(s) by checking the boxes next to their choices. Once they are finished, they will click the button titled, "Continue to Check Out". (This step is optional. An issuer can choose not to pay for additional distribution.)

Check Out—After clicking, "Continue to Check Out", the issuer will be redirected to the Check Out page. At the "Check Out" page the issuer will pay for the distribution they chose from the distribution selection menu. Payment is at "Check Out", and in order to pay, the issuer will enter in their billing information. If having already purchased distribution, their billing information will be present in the space provided on the "Check Out" page. If they wish to change that information, they can at this time. After filling out all the required fields, the user will click "Finish". If the user has filled out the "Check Out" page correctly, the user will be redirected to a new web page, which states, "Thank you for your purchase. A receipt for you order has been sent to your email." (This step is not optional; however, if the issuer did not purchase additional distribution, their balance will be zero.)

VPR Published, Receipt Emailed to User—Once the user finishes completing their order for distribution, a digital receipt is sent to them by email. When the user checks their email, they will find an email from SNNWire with details confirming that their video press release; (a) is scheduled for publishing at the time and date they have requested; (b) has the distribution the user requested; (c) and the cost. The user keeps this email for their records. Once the video press release has been published, the user will receive a second email notifying the user that their video press release has been published and will provide a link to it.

Tracking—24 hours following the publication of a user's video press release the user will receive tracking results for their video press release. The data that the user will receive include video views, unique views to their web page, websites that published their video press release, and the amount of times that their video press release has been viewed. Upon request, the user can request tracking information from SNNWire support.

The steps described above may be used in other parts of the specification to clarify other embodiments by examples.

Illustrative Methods of the Present Invention

Figure 6:
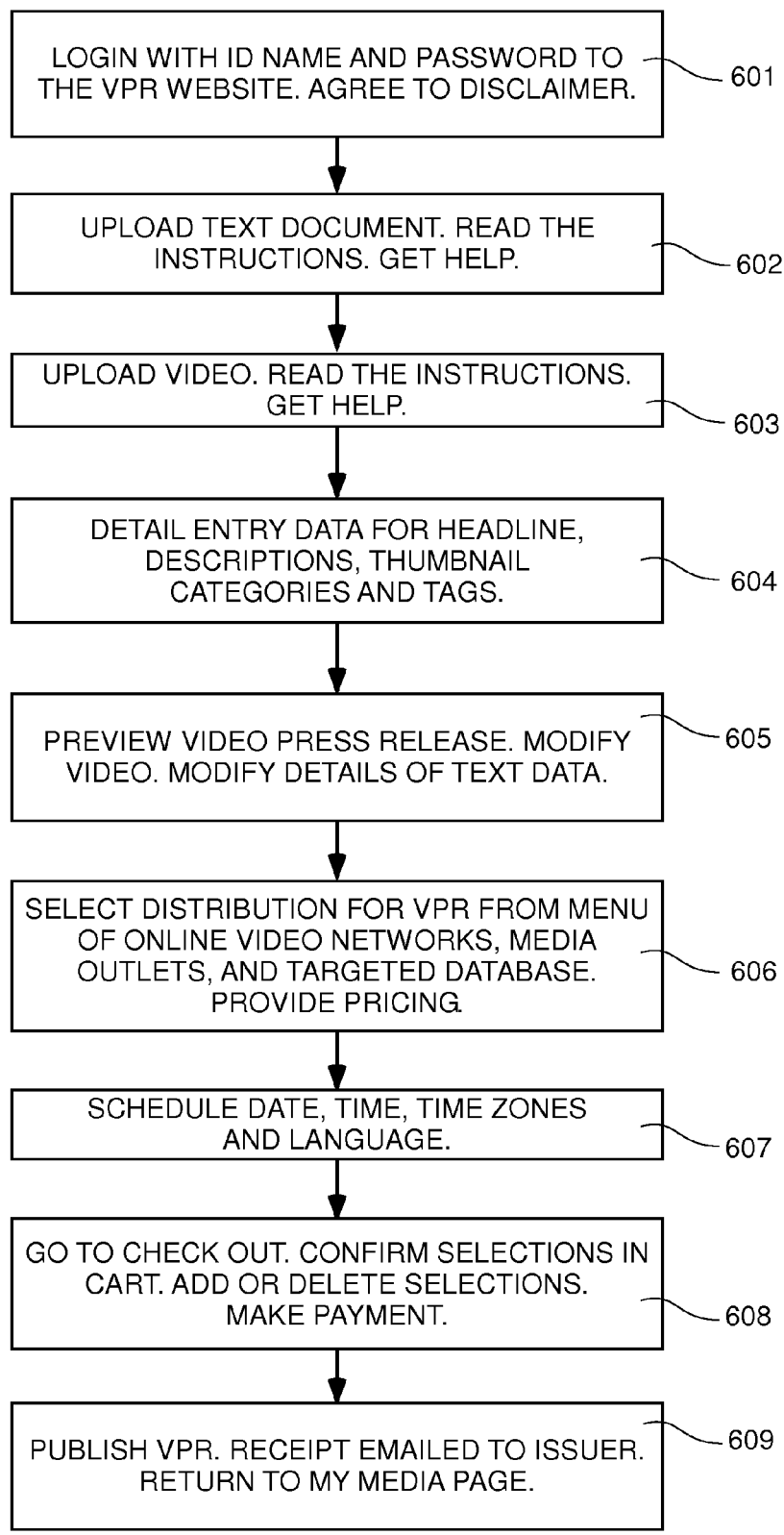
FIG. 6 depicts a process flow chart for a business video press release embodiment of the invention.
Figure 7:
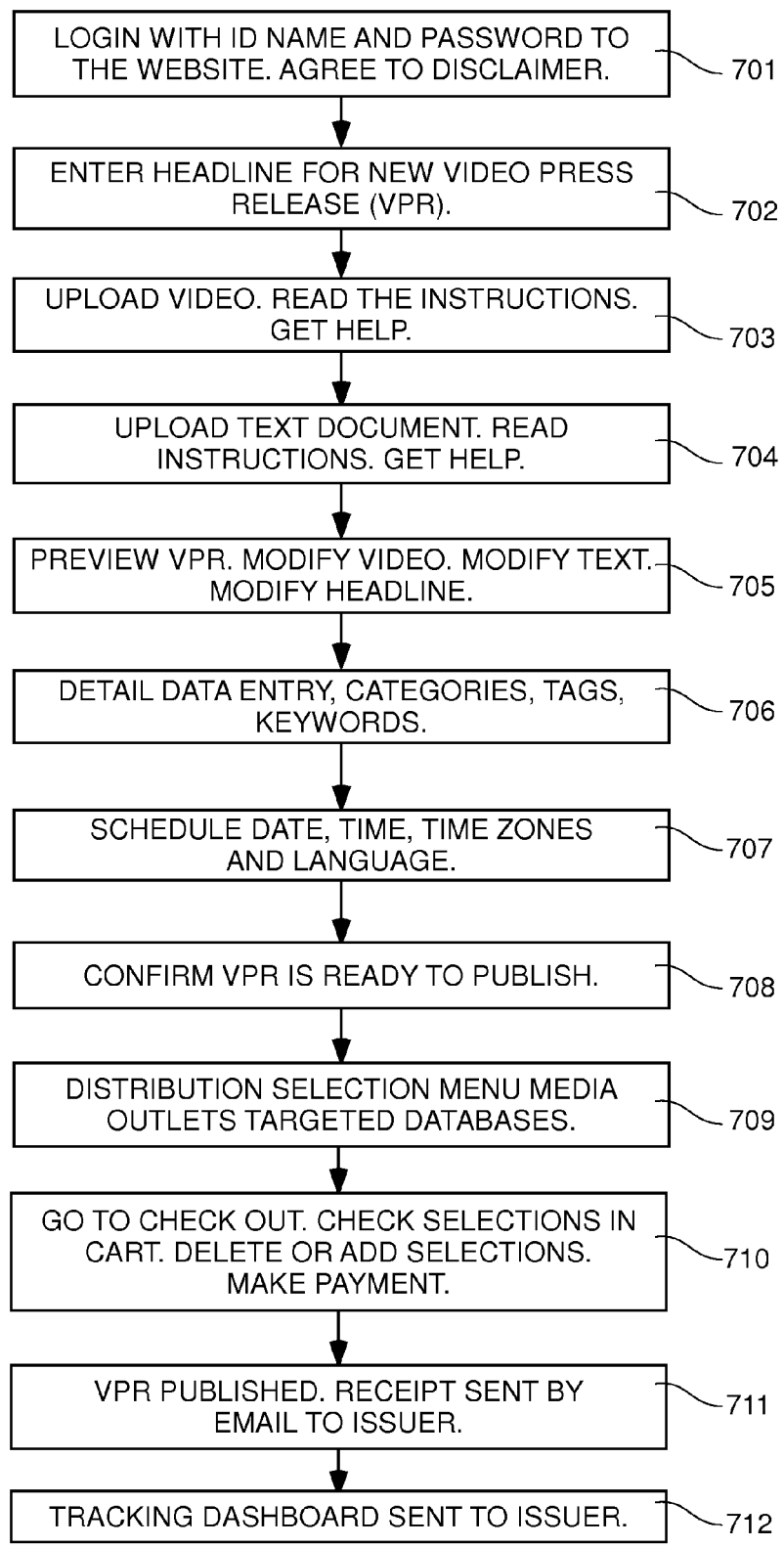
FIG. 7 depicts a process flow chart for a business video press release embodiment of the invention.
Figure 8:
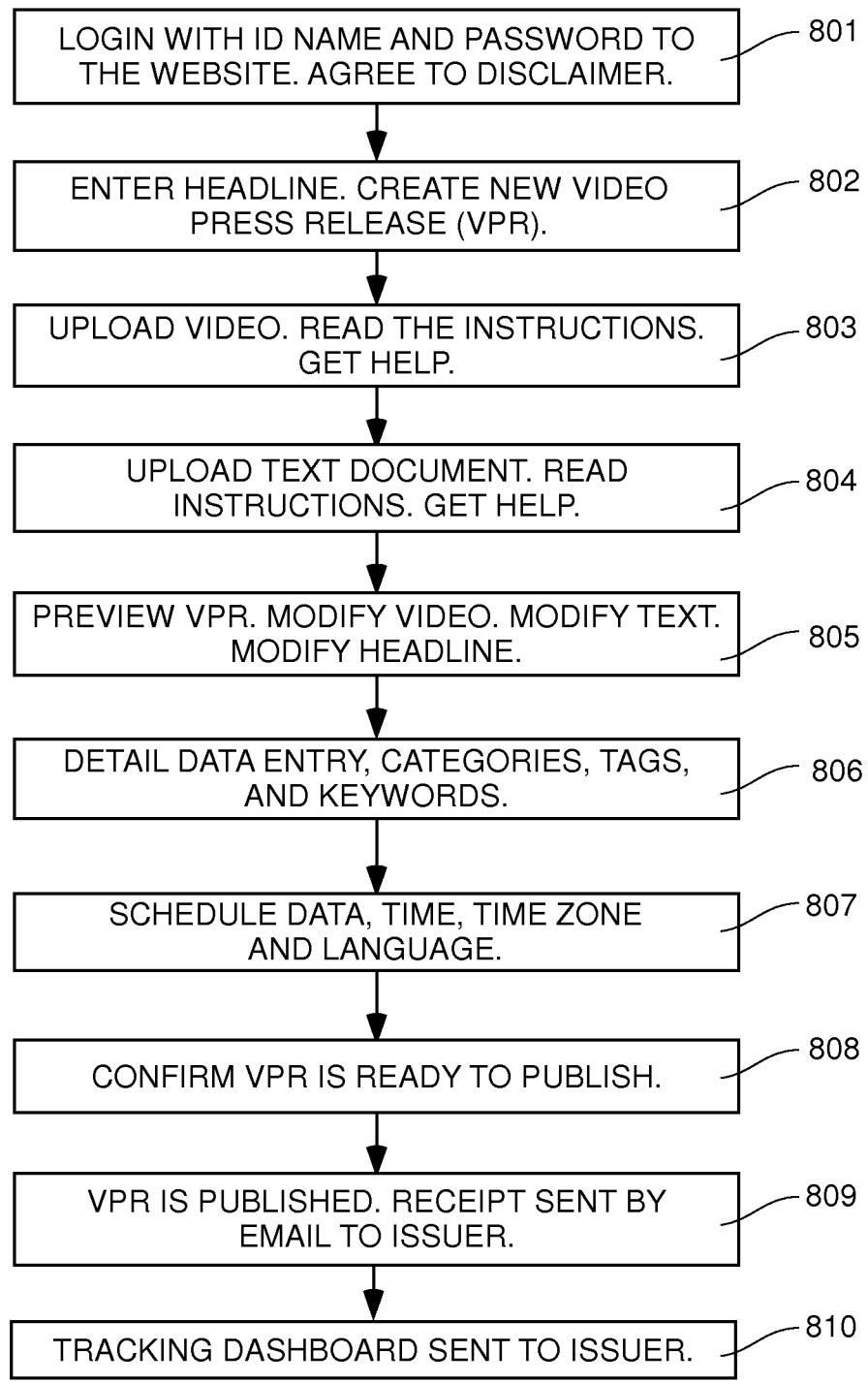
FIG. 8 depicts a process flow chart for a business video press release embodiment of the invention.

In some embodiments of the present invention, the user 101 may work to create the business VPR according to basic operational steps set forth for example in FIG. 6, FIG. 7, or FIG. 8.

FIG. 6 illustrates a method by which a user may create a business VPR at the VPR webpage of the VPR website. In FIG. 6, at 601, for Step 1 the user enters their ID name and password to login to the VPR website and user agrees to a disclaimer. In FIG. 6, at 602, for Step 2 the user uploads a text document file; is provided with text upload instructions; and can get help from the webpage to do the text document upload. In FIG. 6, at 603, for Step 3 the user uploads the video file; is provided with instructions; and can get help from the webpage to do the video upload. In FIG. 6, at 604, for Step 4, the user can detail entry data for headline, descriptions, thumbnail image, categories and tags. In FIG. 6, at 605, for Step 5, the user can preview their video press release; modify the video if needed; and modify the text document details if needed. In FIG. 6, at 606, for Step 6, the user can select the distribution for the publication of the video press release from a menu of online video networks, media outlets, and targeted databases with pricing provided. In FIG. 6, at 606, for Step 7, the user can schedule the date(s), the time(s), the time zone(s), and the language(s) for the publication of the video press release. In FIG. 6, at 607, the system schedules date, time along with time zones, and language for a distribution of the video press release. In FIG. 6, at 608, for Step 8, the user can go to check out in order to confirm the user's selection of scheduled video press release publication(s). The user can add or delete selections and would make payment for the cost of VPR publication(s). In FIG. 6, at 609, for Step 9, the user can publish (i.e., issue) the video press release, and a receipt from the VPR website is emailed to the user ("Issuer"). Note the user is effectively "issuer" of the video press release. The user can then return to the VPR webpage which is also known as "my media page" to create another business VPR.

FIG. 7 illustrates a method by which a user may create a business VPR at the VPR webpage of the VPR website. In FIG. 7, at 701, for Step 1 the user enters their ID name and password to login to the VPR website and user agrees to a disclaimer. In FIG. 7 at 702, for Step 2 the user enters a headline for the new video press release. In FIG. 7, at 703, for Step 3, the user uploads the video file; is provided with a video file upload instructions; and can get help from the webpage to do the video upload. In FIG. 7, at 704, for Step 4, the user uploads a text document file; is provided with instructions; and can get help from the webpage to do the text document upload. In FIG. 7, at 705, for Step 5, the user can preview their video press release; modify the video if needed; and modify the text document; and modify the headline if needed. In FIG. 7, at 706, for Step 6, the user can detail data entry, categories, tags, and keywords. In FIG. 7, at 707, for Step 7, the user can schedule the date(s), the time(s), the time zone(s), and the language(s) for the publication of the video press release. In FIG. 7, at 708, for Step 8, the user can confirm that the video press release is ready to publish. In FIG. 7, at 709, for Step 9, the user can select the distribution for the publication of the video press release from a menu of media outlets and targeted databases. In FIG. 7, at 710, for Step 10, the user can go to check out and check out selections in user's cart and delete or add selections of video press releases to publish. The user will make payment at this time for the VPRs to be published. In FIG. 7, at 711, for Step 11, the user can have the VPR published (i.e., issued) and a receipt from the VPR website is emailed to the user ("Issuer"). Note the user is effectively "issuer" of the video press release. In FIG. 7, at 712, for Step 12, the Issuer can check their tracking dashboard for confirmation(s) that the VPR(s) were published. The dashboard provides tracking results of the video press release they most recently published at various time intervals, for example, 24, 72, 96 hours after publishing. Data that will be provided to the user includes: video views, amount of time watched, unique views, websites on which the VPR was posted.

FIG. 8 illustrates a method by which a user may create a business VPR at the VPR webpage of the VPR website. It leaves out Steps 9 and 10 of the process depicted in FIG. 7. The VPR website user decides to postpone Step 9 which is a selection process using the VPR website that helps the user choose the distribution of the video press release. The selection process is based on a selection menu, which lists online video networks, media outlets and targeted databases at the website. The user chooses not to select a distribution of the video press release based upon a selection menu and does not pay for a distribution search. The user generated video press release is published for the user and a receipt can be emailed from the VPR website to the user, who in this case is also the issuer of the video press releases to designated third party entities. A user may then return to the My Profile Page to, for example, begin to create another video press release.

In FIG. 8, at 801, for Step 1 the user enters their ID name and password to login to the VPR website and user agrees to a disclaimer. In FIG. 8 at 802, for Step 2 the user enters a headline for the new video press release. In FIG. 8, at 803, for Step 3, the user uploads the video file; is provided with a video file upload instructions; and can get help from the webpage to do the video upload. In FIG. 8, at 804, for Step 4, the user uploads a text document file; is provided with instructions; and can get help from the webpage to do the text document upload. In FIG. 8, at 805, for Step 5, the user can preview their video press release; modify the video if needed; and modify the text document; and modify the headline if needed. In FIG. 8, at 806, for Step 6, the user can detail data entry, categories, tags, and keywords. In FIG. 8, at 807, for Step 7, the user can schedule the date(s), the time(s), the time zone(s), and the language(s) for the publication of the video press release. In FIG. 8, at 808, for Step 8, the user can confirm that the video press release is ready to publish. In FIG. 8, at 809, for Step 9, the user can have the VPR published (i.e., issued) and a receipt from the VPR website is emailed to the user ("Issuer"). Note the user is effectively "issuer" of the video press release. In FIG. 8, at 810, for Step 10, the Issuer can check their tracking dashboard for confirmation(s) that the VPR(s) were published.

The VPR website user decides to postpone Step 9 which is a selection process using the VPR website that helps the user choose the distribution of the video press release. The selection process is based on a selection menu, which lists online video networks, media outlets and targeted databases at the website. The user chooses not to select a distribution of the video press release based upon a selection menu and does not pay for a distribution search. A user may then return to the My Profile Page to for example begin to create another video press release.

Illustrative User Interfaces of the Present Invention

FIG. 9 illustrates an exemplary screenshot of a video press release submission area that can be seen by a user when creating a video press release ("VPR") on a secure webpage at a secure video press release website. A user can log in at a main page of the submission area, where the user's previously-saved personal information is retrieved by clicking a soft button "My Profile" 901. The user can create a new VPR by clicking the soft button "Create New VPR" 902. The user can upload a new video by clicking on "Upload Video" 904. After the new video is uploaded, there will appear a check mark right next to the button "Upload Video" 904. The user can upload a text by clicking on "Upload Text" 905. After the upload of text is complete, there will appear a check mark right next to the button "Upload Text" 905. After the video and the text have been uploaded, by clicking the button "Preview VPR" 906, the user can preview the VPR. The user can further click "Submit VPR" 907 to submit the VPR to a distribution network. The user can save the VPR with a file name, the file name can be entered in the box 903 and saved by clicking "save".

The submission area further provides other options to the user. The options can be used in searching, retrieving, and labeling (naming) previously saved VPR. The user can define a category of a video for VPR at a selection box 909, where a list 910 shows most viewed videos and a list 911 shows a listing of categories of videos. A box 912 provides an option to identify a VPR with a keyword, and the "add" button 913 provides a way to add a keyword or tag to the VPR. The user is further provided with an option to select date and time for publication. A box 914 provides to the user an option to publish the VPR immediately and to edit the time for publication. The box 915 provides an option to submit the VPR. A "delete VPR" instruction 917 deletes the VPR, and a button "Submit VPR" 916 submits the VPR.

FIG. 10 illustrates an exemplary screenshot of a video press release preview layout that can be seen by a user when creating a video press release on a secure webpage at a secure video press release website. In the exemplary screen shot, an area 1001 displays a name of a channel, such as, STOCK-NEWSNOW RADIO. An area 1002 shows company information. Website, phone number and email of the channel or company are shown in areas 1003, 1004, and 1005 respectively. A filename of a VPR is shown in an area 1006. Areas 1007, 1008, 1009, 1010, 1012 and 1013 respectively display a first description of the video, a video file/format name, length of video, a second description of the video, file size of the video, and resolution of the video. The actual video for the VPR is displayed in an area 1016. Also an area 1014 offers to the user an option to search a VPR. Pressing a soft button "Next Step" shows the user more options for publishing and/or saving the VPR.

Illustrative Alternative Embodiments and Examples of the Present Invention

The present invention embodiments comprise various methods, various processes, and various systems for collecting and distributing information by creating a video press release about a company's business information including the company business information selected from the group consisting of a market awareness, an investor visibility, a new product announcement, a financial reporting, a regulatory compliance, a management change, a SEC filing 10Q, a SEC filing 10K, a SEC filing 8K, a corporate material event, a corporate change, a corporate merger, a corporate acquisition, a legal proceeding, a trade show, a conference, a road show, a new corporate C level hire, a new contract, a newly offered service, a joint venture, a new marketing agreement, a strategic alliance, a new office opening, a corporate expansion, a mention in another person's research report, a research report, a new share issue, a warrant execution, a new funding, a third party related transaction, a clinical trial, a gas well drilling report, an oil well drilling report, a mining report, a regulatory approval, a company announcement, a company update, a company research report, a third party research report, a company investor relation statement, a company public relations statement, an organization announcement, and initial public offering document, a technology advancement, any other company information, and any combination thereof.

Notably, the method for creating a business video press release includes needing to have only one person to create the business video press release. The method for creating the business video press release preferably takes place at a secure Internet website for a regulatory compliance purpose. The method for creating a business video press release includes having the video press release capable of being previewed and published immediately.

For some embodiments, the invention comprises an apparatus for collecting and distributing information by creating a video press release providing an information service, wherein the software creates a preview of the video press release at a video press release website with a webpage that has an file format selected from the group consisting of XML, HTML, XHTML, MHTML, MAF, ASP, ASPX, ADP, BML, CFM, CGI, iHTML, JSP, Lasso, PL, PHP, RNA, R, RNX, and SSI. For some embodiments, the invention comprises an apparatus for collecting and distributing information by creating a video press release providing an information service, wherein the apparatus provides preview of the video press release at a video press release website with a webpage that has an HTML file format.

For the present invention a preferred video press release is a business video press release. For the present invention several acronyms, terms, words, or phrases are defined to mean the same thing. Note that "VPR", "Video Press Release", and "video press release" shall all mean a video press release. Note that "business VPR", "Business Video Press Release", and "business video press release" shall all mean a business video press release. A business video press release is only business reporting oriented and not generalized.

A first entity administering a VPR website may sell a subscription to VPR users. In this case the user shall be issued a username ID and a password to limit access to the VPR website by unauthorized persons. This prevents a second individual from being able to intercept and corrupt the selectivity and accuracy of the video press release. When a second person is present at an intermediate step in the creation of the video press release then the video press release has a high risk of losing its selectivity and accuracy. In the prior art, two people, namely a media provider and an Internet copywriter were both required to create a news release. The method, process, and system of the present invention advantageously functions without an Internet copywriter. In the prior art of multimedia news release process, a copywriter or human was required which means that the creation and publication of a multimedia news release with time-sensitive factual company information necessarily has the potential to be flawed in a number of ways. Firstly, by involving a human individual in the multimedia news release process there is the risk of one or more accidental errors in the multimedia news release due to inattention by the multimedia news release processor. Secondly, by the multimedia news release process there is the risk of an intentional insertion of a fraudulent fact in the multimedia news release by the multimedia news release processor. Thirdly, by the multimedia news release process there is a lack of control over the distribution of the multimedia news release to its intended recipients. The multimedia news release processor may distribute the multimedia news release to less than all of its designated recipients or to a non-intended recipient. Fourthly, by involving a human individual in the multimedia news release process, there is no guarantee that time-sensitive controls will be respected. The multimedia news release processor may violate the critical date and time for the distribution of the multimedia news release. The multimedia news release processor, for whatever reason, may circulate a copy of the multimedia news release earlier than has been mandated to some of the intended recipients or to another individual. There are many well-known instances of insider information about time-sensitive, factual company information being wrongfully used in a number of ways the invention controls access to the webpage at the VPR website as a security measure to prevent an unauthorized user of the webpage. This prevents an individual from being able to intercept and corrupt the selectivity and accuracy of the video press release.

In the prior art, two people, namely a media provider and an Internet copywriter were both required to create a news release. In the prior art, this occurred during the creation of a multimedia news release. The Internet copywriter as a necessary second person could be an outside free-lance contractor with no actual loyalty to the company needing to make the business VPR. Thus the use of the Internet copywriter during the creating of the VPR constituted a security risk for disclosure of time-sensitive VPR information. The present invention eliminated this security risk by eliminating the need for an Internet copywriter. The system, method and apparatus of the present invention advantageously function without an Internet copywriter. The invention provides that one person (the "user") can perform all the work necessary: to make the video press release and can selectively publish the VPR by scheduling and selecting its distribution to third parties.

Using the present invention as a system, a method, and an apparatus for creating a business VPR, the VPR user does not rely upon a second person. The second person might make one or more accidental errors in the video press release due to inattention of the second individual to important details disclosed in the video press release. Secondly, the user does not have to worry about the risk of an intentional insertion of a fraudulent fact in the video press release by the second individual for any reason. Thirdly, the user retains full control over the distribution of the video press release to its intended recipients. A second individual might have a motive for an improper distribution of the video press release to less than all of its designated recipients or to an additional non-intended recipient. Fourthly, the user retains full control of when the video press release is to be published. There is no risk that the critical date and time for the distribution of the video press release will be disrespected. No one shall be able to view and read the video press release until its designated time and day for publication. The present invention safeguards against fraudulent insider information being circulated. If any of the four issues mentioned arise, then blame can only be pointed at the user. A video press releases is different from prior art news releases in several ways. The video press release process is completely automated. The business video press release is different from a blog in that a business video press release is irreversible and inseparable, whereas a blog is. By irreversible, the business video press release, once it is published, cannot be altered, edited or changed by a second entity—maker of the business video press release. By inseparable, the business video press release is strictly the uploaded text with its corresponding video; neither exist as an entity on its own, nor can a third party extract either video or text file from the published business video press release.

The invention may be a process for creating the business video press release on the webpage of the video press release website wherein the uploading of the business video file includes optionally an editing of the business video file, and wherein the uploading of the business text document includes optionally an editing of the business text document file.

The invention may be a process for creating a business video press release on the webpage of the video press release website wherein a decision to publish the created business video press release is made after a previewing of the business video press release on the webpage of the video press release website. The invention may be a process for creating the business video press release on the webpage of the video press release website wherein the business video press release after its creation is not edited.

One embodiment is a process for creating a video press release, comprising: a first entity operating a VPR website for use by a second entity; the second entity formatting an uploaded video file with an uploaded text document; the second entity creating a video press release; and the second entity previewing the created video press release before publishing the video press release.

A business video press release is also termed more simply a VPR for the present invention. In general the VPR invention can deliver at least two mediums of information (video and text) in a video press release using a computer linked to the Internet at a website of the present invention. For example, the method can utilize a computer linked to an Internet website of a first entity and a second entity can use the website as a subscriber to the website for creating a video press release.

For the present invention, an electronic device is defined to include computers, smart phones, laptops, desktop computers, tablets, iPhones, Blackberry and like personal electronic devices which are capable of making a communications link to an Internet website. Video files generated by a video recording device can be transferred to an electronic device. Video files on an electronic device can be uploaded to an Internet website of the present invention. Text document files on an electronic device can be uploaded to an Internet website of the present invention.

In its various embodiments, a video press release of the invention may be created positioning a portion or all of a text of the press release in one or a plurality of locations on the press release as illustrated for example in FIGS. 2, 3, 4, and 5. In some embodiments of the VPR invention, there exists a software template optionally a box visible to the user at the website into which cases the user may combine and position the orientation of information including said video and said text at the website. In some embodiments of the VPR invention, the video of a video press release in part or in whole may play in one section or a plurality of sections within the video press release. Text and video may fade in and out of view in the video press release as desired. Text and video may be positioned therein in any manner conceivable including laying the text on top of the video. The positioning of the press release text and of the video instead of side by side could be video above the press release text in the press release or of the opposite positioning.

Preferably as illustrated in FIG. 4, the selected positional relationship between a business video file 404 and a business text document file 405 on the webpage of the video press is with the business video above the business text document when the business video press release is viewed.

For some embodiments, the invention is a method of using a computer to play a video press release published on a webpage of a video press release website, comprising: (a) connecting the computer via a URL link to a URL address for the video press release on the webpage of the video press release website for playing the video press release; and (b) playing the video press release on a monitor of the computer for watching a video and reading a text about a company business matter.

For some embodiments, the invention is a method of a first entity managing a video press release website, comprising: (a) the first entity offering a subscription account to the second entity to provide an access to video press release account for a fee; (b) the first entity offering instructions and help for operating the video press release programs; and (c) the first entity providing a distribution for the fee.

In some embodiments, the invention practiced by the user (second entity) of the video press release is a method wherein the user creates a video press release but does not schedule a distribution of the video press release. In this case the second entity may distribute the VPR separately from the distribution network of the first entity.

In other embodiments, the invention is a method for a second entity as a user of the video press release website, capable of creating and publishing a video press release, comprising: (a) the second entity operating the video press release programming; (b) the second entity receiving a series of prompts needing an action from the video press release website program, and the second entity responding to the prompts by the second entity, taking an action selected from the group consisting of: provide ID name and password, enter headline, enter title, upload video, upload text document, create thumbnail, preview video press release, modify video press release, detail data categories, detail data tags, schedule video press release publication date, schedule video press release publication time and time zones, indicate video press release video spoken language and written language, confirm video press release is ready to be published, select distribution for published video press release, go to check out cart, edit check out cart, pay distribution bill at check out, indicate finished at check out, and any combination thereof; and (c) the second entity creating a video press release to inform third entities about company business matters. The invention may have different languages, one for the video playback, and a different one for the written text.

When the user uploads their video, the VPR software can create up to four thumbnails for the user to choose from. The thumbnail can represent how the video will look on an HTML web page or another webpage file format. In addition, the user will have the option to record their video through a webcam recording option.

Multimedia news release must borrow video from a video platform, requiring human intervention in order to embed a video onto an HTML web page. The following solution shows the automation of that process by the present VPR invention. Standard backend blog framework includes video uploading functionality, however, we found that the Standard Word Press Media Uploader (SWPMU) does not allow certain video file types to upload, including, for example, .AVI, and that third parties have problems with playback of file types because they may have out of date operating systems, browsers, or compatibility issues with current browsers and video file types. Furthermore, specific video file types can only play on certain browsers.

For some embodiments of the present invention, significant software code was written that performs the function of improving functionality of software used to create a video press release. Some examples of the software code modifications needed to solve the issue of uploading all video file types, and their playback compatibility on all operating systems and web browsers will be described. VETG ("Video Embed & Thumbnail Generation") 110 (see FIG. 1) only accepted certain video types and videos playback only on certain browsers, for example, if a user uploaded a .MOV video file type, the VETG would check the browser version on the user's computer and convert the .MOV video file type so that it was compatible with the browser of the user's computer. VETG did a poor job at uploading most file types, and there were issues of supporting a broad range of video file types. In order to solve this issue, code was written, using PHP and HTML code languages, on VETG.

In order for playback on all third party operating systems and browsers, we bypassed the file conversion functionality of the VETG plug-in by adding another video file converter plug-in called, "FFMPEG". New code had to be added to FFMPEG in order to achieve this functionality. The new code was written in PHP and LINUX command line language for the FFMPEG. The video file converter, FFMPEG, needed modifications of new code because the default version still needed a second entity to manually convert the video file type into a selection of file types available. In order to solve this problem, using PHP and LINUX common line coding languages, a modified video file converter plug-in, "modified FFMPEG", is used to convert video files to MP4 video files.

MP4 is a video file played most often on browsers (Internet Explorer, Firefox, Google Chrome, Safari) and operating systems (Window 7, MAC OS). VPR embeds the video in a usable video file format "MP4" so video can be played on many browsers and operating systems. VPR makes it possible for a third party to play a video published by a User. If the browser does not work with MP4, the MP4 has a fallback that wraps the MP4 to work as a flash player.

The infrastructure to accept all video file types has been built, and we are currently testing and debugging more video file types. In order to have all video file types supported, optimizing commands are added to the code, i.e., resolution, file size, etc. For the video types that are currently supported, there are approximately 10 options per video file type that have been optimized. Video types that are currently supported include: mp4, m4v, wmv, mov, mpg, mpeg, m2v, fly, avi, 3pg, and 3g2. The result is that a "User" of VPR can upload a video with any file extension without human intervention. This is also a departure from default blogging systems, in that the standard default media player upload was not optimized to accept all video file types, both for uploading and playback. The result of the above is that a "User" of VPR can upload any video file type that will play on all current and old operating systems and browsers.

A problem in the prior art was that the conventional blog software would not permit text file uploading. Since most business reports are text documents in .doc, .docx, and .pdf, this was a significant block to a versatile use of a business report. The blog only allowed "copy/paste" actions from a text document, but the pasted text would be in an incorrect format in HTML and this would require manual reformatting. A blog would also allow typing, but this meant there had to be a complete retyping of document in HTML. A text file type plug-in, "Google Doc Embedder" (GDE), was installed in the invention system to layer over the Text Uploader so that the VPR can use common Microsoft Word text file extensions: .doc, .docx, and .pdf as a result.

In LINUX, using "LibreOffice" software, a word document could be converted to HTML, but there were still formatting issues and the solution was to add code in PHP to correct formatting issues automatically as they occurred. Also formatting checks were added using PHP code.

The present invention created a method, a process, and a system for "previewing" the VPR before its publication. As depicted in Step 5 of FIG. 7, the user can preview a video press release and may modify the video, the text and headline as needed. The present invention provided this technical solution. In the prior art, there was the problem typified by a blog in that the blog could not watch some videos in preview mode on the default webpage. Further note that the prior art multimedia new release system had no previewing ability at all. The VPR solution was to customize the HTML, CSS, and PHP codes, modify layout of the Preview Functionality in Word Press. To prevent editing of published VPR content by a third party, software code was used to remove or hide all "Edit" and "Update" functionality from the WordPress front-end and back-end. For the back-end administrator area, a system was implemented that checks the credentials for the current user (Administrator versus VPR Client) and hides all options for viewing or editing of previous VPRs from the back-end. For the front-end, the VPR solution was to hide or remove all "Edit Post" or "Edit" buttons that could be visible to the user.

The present invention in one embodiment is a method comprising a first entity first operating a website; a second entity then using the website for creating a video press release; and the second entity secondly using the video press release to report on a topic.

In one embodiment, the present invention VPR is a method comprising first producing a video and then joining the video with a text document or text press release. Generally the press release is written by an entity for example, a second entity. In one embodiment a method of the invention comprises joining the video of the second entity with a press release of a second entity. For the present invention the joined text and the video constitute an example of a second entity generated video press release, which can also be termed a user generated video press release.

In one example of the present invention, the first entity does not have access to edit or tamper with any video or text uploaded by the second entity, the user of the website of the first entity. This lack of access by the first entity can critically protect the needs of the second entity for confidentiality of the uploaded video and uploaded text. The second entity can use the website services of the first entity for creating a user generated video press release that retains its confidentiality and secrecy until the video press release is elected to be released, disclosed or published to another entity.

A text of a video press release includes for example a simple word document, .DOC or .DOCX, PDF or Power Point Presentation or any other form of printed language or communication that can be read and includes an audio press release. In computing, DOC or doc (an abbreviation of 'document') is a filename extension for word processing documents, most commonly in the Microsoft Word Binary File Format. Office Open XML (also informally known as OOXML or OpenXML) is a zipped, XML-based file format developed by Microsoft for representing spreadsheets, charts, presentations and word processing documents. Portable Document Format (PDF) is a file format used to represent documents in a manner independent of application software, hardware, and operating systems. Upload word file interface, using "LibreOffice" command line to convert .doc or .docx into HTML. Used custom PHP to format the HTML to display cleanly in WordPress.

Many different text Document file formats can be used on computers. Many operating systems do not limit filenames to a single extension shorter than 4 characters, as had been common with some operating systems that supported the FAT file system. Examples of operating systems that don't have such a small limit include Unix-like systems. Also, Microsoft Windows NT, 95, 98, and Me don't have a three character limit on extensions for 32-bit or 64-bit applications on file systems other than pre-Windows 95/Windows NT 3.5 versions of the FAT file system. Some filenames are given extensions longer than three characters. In some embodiments of the invention, the text uploader can be adjusted as needed to convert other text document file formats onto the VPR HTML web page that was set up using hypertext to set up to do the job of formatting video files with text document files.

The following is a list of some of the Text documents file formats that can be used in practicing the present invention: ABW—AbiWord Document; ACL—MS Word AutoCorrect List; AFP—Advanced Function Presentation—IBc; AMI—Lostus Ami Pro; Amigaguide; ANS—American National Standards Institute (ANSI) text; ASC—ASCII text; AWW—Ability Write; CCF—Color Chat 1.0; CSV—ASCII text as comma-separated values; CWK—ClarisWorks/AppleWorks document; DBK—DocBook XML sub-format; DOC—Microsoft Word document; DOCX—Office Open XML document; DOT—Microsoft Word document template; DOTX—Open Office XML text document template; EGT—EGT Universal Document; EPUB—EPUB open standard for e-books; EZW—Regency Systems easyOFFER document; FDX—Final Návrh; FTM—Fielded Text Meta; FTX—Fielded Text (Declared); Google Drive Document; HTML—HyperText Markup Language (.html, .htm); HWP—Haansoft (Hancom) Hangul Word Processor document; HWPML—Haansoft (Hancom) Hangul Word Processor Markup Language document; LWP—Lotus Word Pro; MBP—metadata for Mobipocket documents; MCW—Microsoft Word for Macintosh (versions 4.0-5.1); Mobi—Mobipocket documents; NB—Mathematica Notebook; NBP—Mathematica Player Notebook; ODM—OpenDocument master document; ODT—OpenDocument text document; ODT—OpenDocument text document template; ODT—OmmWriter text document; PAGES—Apple Pages document; PAP—Papyrus word processor document; PDAX—Portable Document Archive (PDA) document index file; PDF—Portable Document Format; Radix-64; RTF—Rich Text document; QUOX—Question Object File Format for Quobject Designer or Quobject Explorer; RPT—Crystal Reports; SDW—StarWriter text document, used in earlier versions of StarOffice; STW—OpenOffice.org ML text document template; Sxw—OpenOffice.org XML text document; TeX—TEX; INFO—Texinfo; Troff; TXT—ASCII nebo Unicode plaintext Text file; UOF—Uniform Office Format; UOML—Unique Object Markup Language; VIA—Revoware VIA document Project File; WPD—WordPerfect document; WPS—Microsoft Works document; WPT—Microsoft Works document template; WRD—WordIt! Document; WRF—ThinkFree Write; WRI—Microsoft Write document; XHTML (xhtml, XHT.)—eXtensible Hyper-Text Markup Language; XML—eXtensible Markup Language; and XPS—Open XML Paper Specification.

A video length of a video press release may be variable in length. The invention VPR video portion may be for example a user-generated short video. The video portion may be of any duration. The video portion of a video press release could be about 10 seconds to about 60 seconds, about 1 to 3 minutes, about 1 minute to about 5 minutes, about 1 minute to about 10 minutes, about 10 minutes to about 60 minutes or longer as needed. A preferred duration for the video is between about 30 seconds to about 4 minutes.

The video portion of a video press release can be produced by any known or future method of recording or creating a video that can be uploaded or delivered by any means to a website including for example the method of recording or creating a video a device selected from the group consisting a webcam, a video camera, a cell phone, a smart phone, a movie camera, a digital camera, a tablet, a laptop, and any future electronic device with a video capability. The video portion can also be recorded, saved and uploaded by a second entity in the following video file formats:

FLV—Flash Video is a container file format used to deliver video over the Internet using Adobe Flash Player versions 6-11. It is possible to record online flash videos using stream recorders and screen video capture software. The former gives lossless results, while the latter allows recording any video even when anti-leeching measures are used.

.MOV—QuickTime File Format. The format specifies a multimedia container file that contains one or more tracks, each of which stores a particular type of data: audio, video, effects, or text (e.g. for subtitles). Each track either contains a digitally-encoded media stream (using a specific format) or a data reference to the media stream located in another file. Developed by Apple, Inc. For example when a film or video clip is created using Apple products, i.e., iPhone, iPad, MacBook, when compressed, the film or video clip will be saved as a .MOV file.

.MPG—MPEG-1 is a standard for lossy compression of video and audio. It is designed to compress VHS-quality raw digital video and CD audio down to 1.5 Mbit/s (26:1 and 6:1 compression ratios respectively) without excessive quality loss, making video CDs, digital cable/satellite TV and digital audio broadcasting (DAB) possible. Filename extensions include: .mpg, .mpeg, .mp1, .mp2, .mp3, .m1v, .m1a, .m2a, .map, and .mpv.

.WMV—Windows Media Video (WMV) is a video compression format for several proprietary codecs developed by Microsoft. The original video format, known as WMV, was originally designed for Internet streaming applications, as a competitor to RealVideo. Software that can play WMV files including Windows Media Player, RealPlayer, MPlayer, The KMPlayer, Media Player Classic and VLC Media Player. The Microsoft Zune media management software supports the WMV codec, but uses a Zune-specific variation of Windows Media DRM, which is used by PlaysForSure. Many third-party players exist for various platforms such as Linux that use the FFmpeg implementation of the WMV codecs.

.AVI—Audio Video Interleaved (also Audio Video Interleave), known by its initials AVI, is a multimedia container format introduced by Microsoft in November 1992 as part of its Video for Windows technology. AVI files can contain both audio and video data in a file container that allows synchronous audio-with-video playback. Like the DVD video format, AVI files support multiple streaming audio and video, although these features are seldom used.

.MP4—MPEG-4 Part 14 or MP4 is a digital multimedia format most commonly used to store video and audio, but can also be used to store other data such as subtitles and still images. Like most modern container formats, it allows streaming over the Internet. The only official filename extension for MPEG-4 Part 14 files is .mp4, but many have other extensions, most commonly .m4a and .m4p. M4A (audio only) is often compressed using AAC encoding (lossy), but can also be in Apple Lossless format.

Examples of Video file formats supported include: AAF—to hold edit decisions and rendering information, but can also contain compressed media essence; 3GP—the most common video format for cell phones; GIF—Animated GIF (simple animation); ASF—container (enables any form of compression to be used; MPEG-4 is common; Video in ASF-containers is also called Windows MediaVideo (WMV); AVCHD—Advanced Video Codec High Definition; AVI—container (a shell, which enables any form of compression to be used); CAM—a MSN webcam log file; DAT—video standard data file (is automatically created one attempts to burn as video file on the CD); DSH; FLV—Flash Video (encoded to run in a flash animation); M1V MPEG-1—Video; M2V MPEG-2—Video; FLA—Macromedia Flash (for producing); FLR—(text file which contains scripts extracted from SWF by a free ActionScript decompiler named FLARE); SOL—Adobe Flash shared object ("Flash cookie"); M4V—(file format for videos for iPods and PlayStation Portablesdeveloped by Apple); Matroska (*.mkv)—Matroska is a container format, which enables any video format such as MPEG-4 ASP or AVC to be used along with other content such as subtitles and detailed metainformation; WRAP—MediaForge (*.wrap); MNG—mainly simple animation containing PNG and JPEG objects; QuickTime (.mov)—container which enables any form of compression to be used; Sorenson codec is the most common; QTCH is the filetype for cached video and audio streams; MPEG (.mpeg, .mpg, .mpe); MPEG-4 Part 14, shortened "MP4"—multimedia container (most often used for Sony's PlayStation Portable and Apple's iPod); MXF—Material Exchange Format (standardized wrapper format for audio/visual material developed by SMPTE); ROQ—used by Quake 3NSV—Nullsoft Streaming Video (media container designed for streaming video content over the Internet); Ogg—container, multimedia; RM—RealMedia; SVI—Samsung video format for portable playersSMI—SAMI Caption file (HTML like subtitle for movie files); SWF—Macromedia Flash (for viewing); WMV—Windows Media Video (See ASF).

There are a number of Webpage formats listed below which may be suitable for practicing the present invention step of: formatting a video file with a text document file to create a video press release. Preferred Webpage formats are described in more detail and in Examples. In brackets are some of the file extensions for these webpage formats.

Examples of Webpage Formats supported: XML—(.xml)—eXtensible Markup Language; HTML—(.html, .htm)—HyperText Markup Language; XHTML—(.xhtml, .xht)—eXtensible HyperText Markup Language; MHTML—

(.mht, .mhtml)—Archived HTML, store all data on one web page (text, images, etc.) in one big file; MAF—(.maff)—web archive based on ZIP; ASP—(.asp)—Microsoft Active Server Page; ASPX—(.aspx)—Microsoft Active Server Page; NETADP—AOLserver Dynamic Page; BML—(.bml)—Better Markup Language (templating); CFM—(.cfm)—ColdFusion; CGI—(.cgi) iHTML—(.ihtml)—Inline HTML; JSP—(.jsp) JavaServer Pages; Lasso—(.las, .lasso, .lassoapp); PL—Perl (.pl); PHP—(.php, .php?, .phtml)—is version number (prev. abbrev.=Personal Home Page, later changed to PHP: Hypertext Preprocessor) RNA—(.rna)—Real Native Application File; R—(.r)—Real Native Application File (short alternative); RNX—(.rnx)—Real Native Application File (using experimental version 6 of RNA/Karbon Language); SSI—(.shtml)—HTML with Server Side Includes (Apache); SSI—(.stm)—HTML with Server Side Includes (Apache).

In one embodiment of a user generated VPR invention, a recording or a creating of a video press release by an entity employs a device for making a hologram image or picture or video. This embodiment of the VPR invention is a useful method for creating a three dimensional video press release. The present invention includes any known or future means for producing a three-dimensional press release.

In one embodiment of the present VPR invention, the method includes uploading a recorded or created video from an entity such as a second entity to a website of a first entity. A designated company representative may for example, record the video used in the video press release.

In one embodiment of the present VPR invention, a first entity operating a website provides a second entity with a process for creating a user generated video press release as a method for practicing the present VPR invention. The present invention can be a method for creating a regulatory-required public disclosure in a timely manner and delivering the regulatory-required public disclosure in a timely manner. Using the VPR invention is a timely, flexible, readily performed method for a second entity in need of creating a video press release which is easily issued to its intended third party entity, party or audience.

The second entity is a "user" of the website of the first entity with the consent of the first entity. The user of the website can pay the first entity for using the website as a "subscriber" for any uses of the website which would include creating and distributing a user generated video press release. The second entity can create or generate the video press release at the website of the first entity using the methods of the present invention. Thus a second entity may "use", may be a "user", may "issue", may be an "issuer" of the video press release which may be a "user generated (user-generated)" video press release. The second entity may request that the first entity "issue" or deliver the video press release to an intended third entity, party or audience. For example, the second entity may be a company needing to issue a video press release to the public.

A user generates the video press release. The "user generated" video press release may provide the public with information selected from the group consisting of corporate updates, material changes, company developments, changes in management, earnings reports, guidance, and news in a timely manner via a public venue such as, but not limited to an Internet venue. Optionally, an issuer may choose to provide additional non-required information such as non-material events.

In one embodiment of the present VPR invention, the invention is a method for creating a video press release that may be then made available for using or issuing any time of day. This is an important and versatile application of the present invention as a method for an issuer needing a means for creating and releasing a video press release at any time without undue delay. In other words, in some embodiments, the VPR invention is a user generated method for instantly creating a video press release to meet an immediate deadline or when a user wants a control of the content of a video press release.

The VPR invention is a means for a real-time distributing or a queuing for a later release of the video press release. Optionally a user generated video press release can be used in a non-edited state. Particularly useful is that the invention can be delivered in real-time without a delay, or with a selected delay allowing a previewing of the video press release by an entity before its viewing by another entity. Optionally, the VPR invention provides a means for using a time sensitive and preplanned delivery system of the video press release, for example an entity can use a clock and calendar scheduling means. For example, in one embodiment the video press release is a time sensitive product and optionally the video press release can be scheduled by an entity for releasing news immediately or programmed for a later specific day, date and time.

In another embodiment of the invention, the viewership of the video press release may be known by a method of tracking or tracing. A record of the viewership of a video press release can be maintained as a file for an entity. Optionally, in addition, a user generated video press release may be archived, stored, and secure password protected. A video press release can be disseminated via the Internet to a website or the websites selected or pre-selected by an entity. A video press release may be delivered using a plurality of methods including a link or embed as a useful means for broadcasting the video press release to an entity. Usefully a user generated video press release can be a means for properly satisfying a regulatory requirement for a public disclosure at a low cost or by a single entity.

A video press release can be for example used for a mobile application, can be readily watchable, can be viewable and can be readable by an entity. A video press release of the present invention can be delivered when needed or scheduled to a wide spread audience via email.

The VPR invention may use a website of a first entity as a destination website for uploading information of a second entity needed to as a means for creating a video press release by an entity. For security purposes, for example, the second entity can only access the website at the Internet address of the website of the first entity when the second entity has met the requirements of the security system of the website. Meeting the security system requirements can mean that an entity needs to login to access the website using for example, a username and a password to gain access. It is contemplated that a security system for the present invention can employ any known security system including a finger print identity check of an entity, or a retinal scan check of an entity.

In one example of the present invention, the second entity having accessed the website to practice using the VPR invention is permitted to enter a section of the website entitled "Sign In" which then will provide access to the second entity's "My Profile" section. The second entity may create a video press release as a user of the VPR invention by clicking "Create New VPR". The user will also be able to view a video press release in the VPR pressroom, on the website of the first entity or by searching for a specific VPR. The user may be able to view a sample popular VPR. The user will also be able to view their published VPR's in the "My Profile" section.

Optionally, in the "My Profile" section of the website the user may select to "Upload Video Only" a video component created prior to creating the video press release and thereby create a video component of the video press release. In one example of the video press release, a second entity has an option of creating the video component of the video press release using one or a plurality of video recording devices, and using said created for the video component of the video press release. A second entity then has the option to "Upload Video Only" prior to creating the video press release or upload said video when creating the video press release.

In another example of the video press release, a second entity can create the video component of the video press release using the "Web Cam Recording" option during Step 3, when creating a new VPR. The video component may be termed a webcam recording.

The present VPR invention provides a method for delivering information by a "video press release" wherein the information comprises two or a plurality of forms of communication. In the present VPR invention multiple forms of communication can be combined together and exhibit synergy as a means for delivering a video press release.

For some embodiments of the present VPR invention the information may be communicated in two or a plurality of mediums of communication that are delivered by the video press release separately in time, or separated by time delays, or simultaneously in time. It has been found that adjusting the timing of delivery of the mediums of information can be tested to optimize the effectiveness of the video press release as an information tool by increasing its appeal, its emphasis, and its focus to certain more important details of the video press release. It is contemplated that some designs of the video press release will be more comforting and more stimulating than others to a viewer and listener of the video press release. In general the present invention is a useful method for providing a more efficient and more complete transfer of the information contained in the video press release to its audience or recipient.

Forms of information useful for the VPR invention include various combinations of the following: a written form of information, an audible form of information, a braille form of information, a visual form of information, an image form of information, a video form of information and conceivably any other form of information. For the present information a form of information can also be called a medium of delivering information. Examples of a communication providing a written form of information include the following mediums for delivering information individually or in any combination: a written press release, a written document, a symbol, a trademark, anything perceived to be writing, a written diagram, a written FIG., a braille communication, and the like. For some embodiments of the present invention, an effective audible form of information may be considered a form of written information. Effective audible forms of information may advantageously improve the meaning and read of written information.

Examples of a communication providing an audible information include the following mediums for delivering an information individually or in any combination, the audible information selected from the group consisting of an audio, an audio talk, an audio discussion, an audio communication between several entities, a song, a sound, sounds of any frequency, a rhythm, a music, a melody, a familiar sound, a sound producing a desired Pavlov conditioning association with the text subject of the video press release, and a low frequency sound.

An audio talk is defined to include one that audibly can be used to repeat words in a written text of the video press release. In general, optionally timing the pace of talking in the audible section of a video press release may be helpful to establish a reasonable pace for the reading of written information portion of a video press release. A proper or clever speech of an audible sound can be stimulating and a reminder to focus on the written text in a video press release. This can be a useful method for preventing boredom or an incomplete understanding of the video press release. For example, optionally, some audible information can be synchronized to the scrolling of some written information on top of a visual information section of the video press release.

For the present invention a video comprises a visual medium or a visual object to the eye or a visual image to the eye. Examples of a visual medium or a visual object to the eye or a visual image to the eye may be selected from the group consisting of an image, or a drawing or a sketch or a painting or a photo or a DVD image or a DVD video or a digital photo, or a photo file on a CD and the like. For the present invention a video can contain a combination of a static and a moving image selected from the group consisting of a still picture, a collage of pictures, a fading in and out picture, a slide show of pictures, a series of pictures, a series of pictures changing at any frequency or repeating in any format, and a video.

For the present invention a tag is broadly defined. An HTML tag is defined as a code that describes how a Web page is formatted. HTML tags are defined by the characters < and >. There are dozens of HTML tags in valid HTML, another dozen or so deprecated tags (tags that are no longer part of the specification), and a few tags for specific browsers like Internet Explorer only tags, Netscape only tags, MSN TV/WebTV only tags, and others. A tagging may include a means for or a labeling of some object in an image or elsewhere on a website with a text such as a word or another image or to start a process.

Additionally for the present invention, a tag can be an application product from a software program which can provide information in a text form for example, triggered to become visible when triggered by scrolling a mouse or a cursor symbol on top of an image. A tag can be used on a computer screen while an entity is in a section of a website or website page containing an image programmed in some means to contain information that can appear if the information has been "tagged" to that image. Commonly used is an application tag such as those well known in the art of computer programming, for example Internet program usages and an application tag may include by a software instruction to send an entity to another HTML address or to simply trigger a website program to operate on the section of the website where an entity is viewing the website of the first entity.

The present VPR invention has many contemplated embodiments, which comprise a method of communicating a combination of two or more forms of information selected from the group consisting of a written form of information, an audible form of information, a braille form of information, visual information, an image form of information, and a video form of information. One embodiment of the VPR invention is a process for creating a video press release comprising: first uploading a video; second uploading a written press release; and third combining the video with the press release. Another embodiment of the VPR invention is a process for creating a video press release comprising: uploading a visual form of information; uploading a written form of information; and combining the visual form of information with the written form of information. Another embodiment of the VPR invention is a process for creating a user generated video press release comprising: uploading an image form of information; uploading a written form of information; and combining the image form of information with the written form of information. Another embodiment of the VPR invention is a process for creating a video press release comprising: making a video based upon a press release; uploading the video; uploading the written press release; and combining the video with the press release. Another embodiment of the VPR invention is a process for creating and using a video press release comprising: making a video based upon a press release; uploading the video; uploading the written press release; combining the video with the press release; using the video press release as a means for effectively communicating a press release.

Another embodiment of the VPR invention is a process for creating and using a video press release comprising: a first entity providing a video press release service to a second entity; a second entity making a video based upon a press release; a second entity uploading the video; a second entity uploading the written press release; a second entity combining the video with the press release; and the second entity using the video press release as a means for effectively communicating an information to another entity. Another embodiment of the VPR invention is a process for creating a video press release comprising the steps of: first uploading information of one form; second uploading an information of a second form; and third combining the first uploaded information with the second uploaded information creating a user generated video press release. Additional embodiments of the VPR invention are below provided but are not intended in any manner to limit the possible scope of the invention. Examples A, B, C, D, E, F, G, H, I, J, K, L, and M below are provided merely to further point out and describe some examples of the invention which may be used for example, for creating a user generated video press release.

Example A

One embodiment of the VPR invention is a process for creating a video press release comprising a first step of uploading a communication; a second step of uploading a video; and a third step of combining said communication with said video.

Example B

One embodiment of the VPR invention is a process for creating a video press release comprising a first step of uploading a video; a second step of uploading a communication; and a third step of combining said video with said communication.

Example C

It is contemplated that the VPR invention can be enabled for a blind or vision-impaired person by modifying embodiment Example (A). Specifically an audio uploading step would substitute for the video uploading step. Additionally the press release communication uploading step would be replaced by a braille document uploading step enabling a hand of a blind or a visually-impaired person to read the braille document while said person was listening to the audio.

Example D

It is contemplated that the VPR invention can be enabled for a deaf person by modifying embodiment Example (A). Specifically the video upload optionally would contain written subtitles instead of an audio portion to the video.

Example E

One embodiment of the VPR invention is a multi-step process for creating a video press release comprising a first step of uploading a written communication; a second step of uploading a video; and a third step of combining said written communication with said video.

Example F

One embodiment of the VPR invention is a process for creating a video press release comprising a first step of uploading a video; a second step of uploading a written communication; and a third step of combining said video with said written communication.

Example G

One embodiment of the VPR invention is a process for creating a user generated video press release comprising the steps of: uploading audible information; uploading a video; and combining said audible information with said video.

Example H

One embodiment of the VPR invention is a process for creating a video press release comprising: uploading a video; uploading audible information; and combining said video with said audible information.

Example I

One embodiment of the VPR invention includes a process for creating a user generated video press release, the process comprising: a first step comprising uploading in any order an information of a written form, an information of an audible form and an information of a visual form; and a second step comprising combining the uploaded information of the written form with the information of the audible form with the information of the visual form.

Example J

One embodiment of the VPR invention is a process for creating a video press release comprising a first step of uploading a press release; a second step of uploading a video; a third step of uploading an audio; and a fourth step of combining or joining the press release with the video and with the audio.

Example K

One embodiment of the VPR invention is a process for creating a video press release comprising a first step of uploading a visual information; a second step of uploading an written information; and a third step of combining said visual information with said written information.

Example L

One embodiment of the VPR invention is a process for creating a video press release comprising a first step of uploading written information; a second step of uploading visual information; and a third the step of combining said written information with said visual information.

Example M

One embodiment of the VPR invention is a process comprising creating a user generated video press release and using said video press release for educating an entity such as a public entity.

In one embodiment of the VPR invention the process for creating a video press release optionally may include the step of adding a detail selected from the group consisting of a headline, a description, a tag, and a thumbnail.

In one embodiment of the VPR invention the process for creating a video press release optionally may include the step of adding a detail such as an application tag selected from the group consisting of a tag, and an HTML tag.

In one embodiment of the VPR invention, said process for creating a video press release optionally may include the step of previewing a portion or all of a video press release. In one embodiment of the VPR invention, said process for creating a video press release optionally may include the step of previewing a portion or all of a video press release at the same time as previewing a portion or all of a second video press release.

The document type includes the kind of documents having a suffix selected from the group consisting of .pdf, .doc, .docx, .xls, .xlsx, .ppt, and .pptx. The VPR invention may use a company approved text press release, optionally obtained for example from a desktop computer being used to create the video press release.

The VPR invention may include a process for uploading a video whereby the user can upload a video component of the video press release from one or more website places: by clicking a website "upload" button for uploading the video from for example a desktop computer or the like. Once the user has selected and highlighted the desired video, the user may click the upload button. The user may insert information about the video press release including: providing a headline such as the title as company approved text press release; describing the first four lines of text press release; categorizing where the video press release can be viewed in the VPR media room; giving a tag such as keywords or phrases which apply to the video press release useful for Internet search engines to locate; adding a thumbnail, a photograph, or a still of a video, logo, trademark of the first entity, proprietary warning, advisement, copyright advisement, or any such image for the video component of the VPR invention.

In one embodiment of the VPR invention, a means for purchasing the VPR process is achieved using a "pop-up" on the website of the first entity. The timing of the pop-up may be selected for example, after a user has scheduled a time and a date for publishing a video press release. The user would also be a subscriber on the website to the first entity. When a user clicks on a pop-up, the user is sent to a separate window of the website of the first entity, the page serving as an e-commerce portal for the user to make a purchase of a targeted distribution of their video press release. After the user has purchased a targeted distribution of their video press release, a separate window will come up on the browser of the user for the website of the first entity, the window providing a menu for the user to choose to whom and to where the user shall need their video press release to be sent.

In one embodiment of the VPR invention, a means for completing the process of creating the video press release includes sending an invoice to the email of a user with documentation about the service the user had purchased (the "purchase"). Optionally whether or not the user purchased a distribution of their video press release from the first entity, a tab where the user created the video press release will still be open. In one embodiment of the VPR invention, a means for publishing the video press release from the website of the first entity includes using a link to send the video press release to a selected and purchased group of distribution services available from the first entity. During the process of sending out the video press release, optionally the first entity may not have access to open or view the video press release prior to its release by the second entity. Optionally, the VPR invention provides the means for the website of the first entity to track who among the distribution services opens to view and does not open to view a video press release of the second entity. In addition, a website of the VPR invention can send a tracking report to the user as often as requested by the user or for example on a timely basis including every few minutes, hourly, daily, weekly, monthly or annually and the like. In addition, the tracking report will send the user information regarding the following: video views, unique views to webpage, click-thru, and websites on which the VPR has been posted.

In another embodiment of the VPR invention, the video press release will be automatically syndicated to Social Media after the user's video press release has been published to the public, including: Twitter, Facebook, StockTwits, LinkedIn.

In another embodiment of the VPR invention a user having a "my media" account can use their password to access their "my media" account. The user having purchased a VPR account may select a package to have one VPR or select a package to have a period lasting for example a month, 3 months, 6 months or 12 months and shall have an unlimited use of the website of the first entity as means for the second entity creating a video press release. When the package is expired, the user account will be deactivated until the user reactivates the account by purchasing a package again.

For the present invention, the website of the first entity provides a means for a first entity, a second entity or a third party for distributing a video press release to a media outlet selected from the group consisting of: a social network, YouTube, a media, a website, a Yahoo finance website, an AOL website, a Google website, a magazine, a printed magazine, a website magazine, a newspaper, a cable TV, a satellite TV, a radio station, a blog, a mobile phone application, a targeted investor database, an accredited investor, an unaccredited investor, an investment banker, a financial advisor, a registered investment advisor, a research analyst, a market maker, a trading firm, a professional (lawyer, accountant), an investor relations professional, a public relations professional, a database for the medical professional, a database for the real estate professional, a population in a region, a database based on opted in subscribers, a database based of double opted in subscribers, a database of website registered visitors, a particular database based on SIC (Standard Industrial Classification), a unique database based on a specific request by an entity, and a particular shareholder list.

In one embodiment of the VPR invention, the website of the first entity provides the means for language translating of text and inserting subtitles to facilitate understanding or hearing the audio portion of the video press release.

In one embodiment of the VPR invention, use of the VPR invention as a website by the first entity operates on a pay per view model or pay per use model to a subscriber using the website who may be called the second entity. For example, use of the VPR invention by the first entity provides a means for tracking video viewing and collecting data in terms of which particular video press releases were watched and regarding viewership including a viewer's IP address (Internet protocol address), viewing duration, and date and time of day.

In one embodiment of the VPR invention, the website of the first entity provides the user of the website a plurality of options once the user has created a video press release. The options concern how the video press release is to be issued. When the user issues the video press release, then the user for the present invention shall be called the "issuer". As an example of how the "issuer" of the video press release may use the VPR invention, the invention provides a means for the "issuer" of the video press release to: first, optionally to choose from a distribution menu at the first entity's website as to where the video press release will be distributed and optionally enables the "issuer" to track the viewership of the distributed video press release. Furthermore in this example, the VPR invention provides a means for the first entity of the video press release to obtain a payment for the service of distributing the video press release for the "issuer". In addition, the first entity may charge a pay-per-view fee to the "issuer" of the video press release. The pay-per-view fee may be automatically deducted from the account of the issuer of the video press release.

Prophetic Example 1

New User Creation and Use of the Business Video Press Release

Note that various elements of this prophetic example are depicted in the flow chart of FIG. 7. The ABCD company, a publicly traded technology company on the NASDAQ Stock Exchange with symbol ABCD, needs to publish by 8 AM EST on July $30^{th}$, a press release to investors to announce a July $25^{th}$ Joint Venture Partnership with a company XYZ. The CEO of the ABCD Company, Mr. Jones, decides to create the press release using a video press release (VPR) product available at a VPR website of a company called SNNWire. This is Mr. Jones' first attempt to create a business video press release.

To get started, Mr. Jones submits a "Contact Us" form at the SNNWireCompany website and its sales representative calls Mr. Jones to discuss VPR subscription options. Mr. Jones chooses s 6 month contract for an unlimited number of video press releases and pays a contract invoice. He uses a SNNWire "Sign-up" form to create a username and password for his VPR account.

ABCD Company's marketing department has a draft text word document (a .docx file format) for the press release that is approved for compliance by ABCD lawyers.

For the VPR, Mr. Jones records a video on his MacBook Pro using the iMovie application that is 75 seconds long. Mr. Jones introduces himself and his title, and the name of his company. The video allows Mr. Jones to communicate a personable confident view of the ABCD company partnership with XYZ. Mr. Jones then lets viewers know about other sources for additional information. Mr. Jones says "Thank you for Watching" and ends his video recording session. Mr. Jones exports the video from his MacBook Pro using Quick-Time and saves the video on his desktop as a ".mov" file. From his desktop Mr. Jones then uploads the .mov file to the ABCD Company's Dropbox account for video approval by ABCD lawyers. On July 28th Mr. Jones by email learns that the lawyers approve publication of the 75-second video.

On morning of July 29th Mr. Jones signs into his VPR account at the SNNWire VPR website using his username and password. He clicks "Log in" and the home page refreshes. Mr. Jones reads a software template with VPR instructions. Under the "My Profile" button, he clicks "Create New VPR" which redirects him to a new web page where Mr. Jones enters the Headline title for his video press release by typing it there and he clicks "SAVE". [Note, alternatively he could copy & paste the title from his press text document.]

Mr. Jones clicks "Upload Video" and a Pop-Up displays. Mr. Jones intends to use his 75-second company-approved video. [Note, alternatively he could have uploaded a video file from his "Media Library" at the VPR website where uploaded media files are saved.] Mr. Jones clicks "Upload Files" and "Select Files" which displays his desktop file folder. He double-clicks on the 75-second video file (the .mov file in his desktop) causing it to upload and populate his VPR "Media Library folder". To the right side of the pop-up, Mr. Jones chooses a thumbnails to be generated from his video and clicks "Insert into Post" to refresh the page and save the video portion of his video press release in the Media Library folder of his VPR account at the SNNWire VPR website.

Next, Mr. Jones clicks "Upload Text". Another pop-up displays on his computer screen request him to "choose file". He clicks, "choose file", which redirects him to a window to locate his company-approved text word document. Mr. Jones locates this text document on his desktop in the window and double-clicks on it. When the name of his text word document appears next to "choose file", he clicks "Insert". The web page refreshes, meaning saving his word text document has been saved in his video press release in the Media Library folder of his VPR account at the SNNWire VPR website.

Effectively now Mr. Jones has uploads of his 75 second Video file and his Text document and a Headline saved as files in his VPR account's Media Library at the VPR website. He clicks "Preview VPR" which redirects him to a specialized HTML web page where he is able to preview his Video, Text Document and Headline precisely as the public would it if the HTML Preview is published at that moment as a video press release (VPR). Mr. Jones carefully reviews, approves of his VPR creation and clicks "Next Step" to signify his acceptance of the video press release and to finish the process.

The display prompts Mr. Jones then for data about his video press release. He indicates his company industry is "Technology" and enters Keywords ("Tags") and separates each Tag by a comma. Following instructions, Mr. Jones selects Keywords and phrases relating to the words and visual content of his video press release. He understands that these keywords and phrases act to increase the probability his VPR will be encountered when third parties are using Internet search engines because the keywords and phrases are indexed higher on the displayed search engine results. After Mr. Jones completes his answers to the data prompts about his video press release, he schedules publication of his video press release to occur Tuesday July 30th, at 8:00 am EST/5:00 am PST. Following website instructions, he enters this date, time, and time zones. With complete confidentially, his VPR publication only occurs from the VPR website of SNNWire according to his scheduling instructions. Once this is done, Mr. Jones clicks "Submit". A pop-up displays asking Mr. Jones to confirm he is sure that he wants to publish his video press release as it is scheduled. He checks and then clicks "yes". Mr. Jones is redirected to the Distribution page at the VPR website.

At the Distribution page of his VPR account, Mr. Jones selects the websites to which he will authorize the VPR website of SNNWire to automatically distribute as a publication his video press release. Mr. Jones selects (a) national media outlets and (b) a database targeting investors interested in technology as distribution locations for the ABCD Company VPR publication.

Mr. Jones will then be guided to proceed to his Checkout Cart. At check out, Mr. Jones must pay for the distribution he intends to be accomplished by the VPR website operated by SNNWire. He completes ABCD Company billing information and clicks "Submit". Mr. Jones is redirected to a web page stating "Thank you for your purchase and you will receive your payment confirmation email shortly". At this point in the prophetic example, Mr. Jones has created his video press release on behalf of his employer, ABCD Company. On a given date and time, Mr. Jones has elected to selectively restrict distribution of the video press release to (a) national media outlets and (b) to a database targeting investors interested in technology. SNNWire has been paid 6-month subscription fee and is being paid a specific extra fee for distributing and publishing the ABCD VPR.

Approximately 15 minutes later, Mr. Jones next checks his email to see that he has received a digital receipt confirming: the day and time his video press release will be published; where the video press release will be distributed; and that payment has been received for the exact amount specified. On Tuesday July 30th, at 8:00 am EST/5:00 am PST, he next receives another email confirming that his video press release has been successfully distributed to the website locations that Mr. Jones has chosen.

On Wednesday, Jul. 31, 2013, Mr. Jones next receives another email with tracking information that advises him as to how many views his video press release has received, the amount of minutes his video has been played, unique page views to his video press release, and a list of the websites which show his video press release.

Hypothetically, Mr. Jones could have hired the more-costly AJAX Company to create and publish the ABCD company press release with a video. Mr. Jones would have had to oversee the production and be filmed. AJAX company fee charges to ABCD Company would have to include at least the cost of the employees and overhead of the AJAX Company plus a profit margin. Rather than going this expensive route with the AJAX Company, Mr. Jones saved the ABCD company money by creating the video himself by creating a VPR.

In the process of practicing the invention, Mr. Jones is capable of well-protecting the confidentiality of ABCD Company information contained within the video press release, prior to its intended publication. As a result of this surprisingly effective high-level control of confidentiality during VPR creation and prior to VPR publication, the risk of ABCD Company to insider-fraud and to third-party fraud and information piracy is sharply minimized. No one at the VPR website but the VPR account subscriber has access to a VPR account. The username and password are essential and exclusive secrets for the VPR account holder.

This prophetic example illustrates the straightforward process by which a single person can create a novel video press release product and use this product for informing third parties about a business activity that will be important news to for example its investors or shareholders. By this prophetic example, the VPR invention has been illustrated to be: (1) a website operation by SNNWire Company (the "first entity") who sells VPR subscription accounts and VPR publication distributions to Mr. Jones of the ABCD company (the "second entity"). When the VPR is published by the second entity using the VPR website of the first entity, then the VPR publication is distributed to: (a) national media outlets, and (b) a database targeting investors interested in technology or other specific or non-specific criteria, wherein (a) and (b) are the "third entities" in this prophetic example.

Prophetic Example 2

Uploading Business Video Press Release with Video Created on Mobile Device that Publishes "as Soon as Possible"

Sharon Smith is the CEO of EFG, Inc., a publicly traded Micro-cap Biotechnology company listed on the OTCQX Stock Market, symbol: EFGGY. She has signed a one year contract with SNNWire to use the video press release website and practice the VPR invention as a user and VPR issuer. She has uploaded three video press releases since she signed up with SNNWire a month ago. On Monday morning, June 3rd, she receives news from Dr. Wolny, her CRO (clinical research organization) clinical advisor overseeing an EFGCompany Phase II Clinical Trial investigating an experimental treatment for liver cancer. Dr. Wolny is happy to report that the EGR's experimental liver cancer drug therapy provides a significantly increased survivor benefits compared to the control arm of the trial which the best standard therapy currently available. Ms. Smith now realizes that the EGR Company will need to raise capital funding to pay for Phase III clinical trials much sooner than originally planned. She believes this positive information needs to be immediately reported to ERG investors and decides to publish a video press release as soon as possible to a selective distribution of medical technology investors.

Ms. Smith is away from the Boston location of the ERG company office. She is attending a financial conference in San Diego and does not have her laptop computer to record a video. She has her iPhone 5 which can record HD quality video. Her Director of Investor Relations (DIR), Mr. Edwards drafts a text document for the VPR and the draft document to her and to ERG company lawyers for comments and approvals. Ms. Smith and the lawyers approve a draft text word document quickly.

Then Ms. Smith records a video of herself using her iPhone 5. The iPhone 5 is a portable, cellular smart phone capable of recording a HD (HD means high definition) quality video. She creates a 90 second video in which she presents a poised confident image as a proactive executive discussing importance of the unexpectedly-promising ERG Phase II clinical results. After reviewing the 90 second video, she emails the video to Mr. Edwards, the DIR who receives, saves and views the 90 second video on his iPhone 4 mobile device. The DIR believes the 90-second video and text document are appropriate.

Ms. Smith asks Mr. Edwards to create the VPR and publish the VPR as soon as possible. The DIR connects his iPhone 4 to his MacBook Pro computer and transfers the 90-second video to the computer using a USB cord between the iPhone 4 and computer. The video is imported into iMovie on the computer and from there, exported to his desktop folder by clicking the option "Export Movie". He has a text document he wrote exported to his desktop.

Mr. Edwards (DIR) keeps Ms. Smith advised along the way, and quickly creates a video press release at the VPR website of SNNWire Company using the 90 second video and the text documents. Mr. Edwards preview the video press release, and enters categories and tags.

Mr. Edwards schedules the VPR for "As Soon As Possible" scheduling and proceeds to the distribution page. The DIR chooses to distribute the video press release to the media and to 3,000 people whom are part of a targeted distribution database who have indicated an interest in receiving information about micro-cap biotechnology companies as investments. The DIR pays for the cost to distribute the video press release; clicks "Finish"; checks his mailbox; and finds a VPR receipt for the VPR order. There is a confirmation of the scheduled time of release of the video press release for the ERG Company. A second email arrives shortly thereafter that indicates the ERG Company video press release has been published. Mr. Edwards clicks on the link provided in the email and confirm that the video press release has been published. Mr. Edwards emails and forwards the link to the VPR to Ms. Smith the CEO of EFG, Inc. who can immediately view the ERG Company VPR.

Prophetic Example 3

Uploading Business Video Press Release with Non-Apple Product and Saving Video to Media Library Mr. Johnson is the CEO of HIJK Corporation, a private real estate company. He recently has signed a 3-month contract with SNNWire and once has recorded a video press release. Mr. Johnson now wants to create and distribute a video press release on February 4th to announce the company re-launch of their company website with improved features and functionalities. The website has been tested and debugged.

On January 31, Mr. Johnson writes a draft text document for VPR, which he proofreads and sends to his marketing department for their review. On February $1^{st}$, the marketing department review is done and the polished text document is a PDF file in Mr. Johnson's computer.

On February 1st, Mr. Johnson records a 3-minute video for the video press release on his Sony VAIO by opening his Windows Live Movie Maker and clicking "Webcam Video" to records the video. On his second video he is satisfied and saves the video as a ".wmv" file to his desktop of his computer. Now Mr. Johnson has a 3-minute Video and a polished text document for creating the HIJK Corp. video press release.

Mr. Johnson Next logs into his VPR account on the VPR website of the SNNWireCompany and goes to the VPR Media Room. He enters a Headline for the video press release and uploads his 3-minute video. Mr. Johnson follows the directions and performs the following procedural step. He clicks "Upload File" and clicks "Select File" by this procedure; he finds his ".wmv" Video file and uploads the Video file to the Media Library of his VPR account. He next chooses a thumbnail, and clicks "Insert into Post".

At this moment he is reminded of a meeting occurring in 5 minutes. Mr. Johnson postpones finishing the creation of his video press release. Because he already has uploaded the video component to his "Media Library" and has a PDF copy of the polished text document in his email, Mr. Johnson knows he can finish his video press release at home on another computer. He confirms that his "Media Library" contains his 3-minute Video, closes his work computer and goes to his meeting.

That night after work, Mr. Johnson completes his video press release at home but stops before previewing his VPR on the specialized HTML webpage of his VPR account. The next morning, he uses his HP-Pavilion 20" All-In-One Desktop Computer to log into his VPR account at the VPR website operated by the SNNWire Company. On a second window on his computer, he opens his email and downloads a PDF copy of the polished text document to his computer.

He enters the VPR Media Room of his VPR account and opens up his draft work on the video press release. Next he double checks to make sure its Headline is correct, and clicks "Upload Video" to play back the video he uploaded the day before to his "Media Library". Mr. Johnson next highlights the video; chooses his thumbnail; and clicks "Insert into post". Next Mr. Johnson clicks, "Upload Text"; clicks "Choose File"; locates his PDF file of the polished text document on his desktop; next double clicks on it; and clicks, "Insert into post".

He then previews his video press release on the specialized HTML webpage of his VPR account. He is very content with his video press release; checks the proper category boxes; writes in all his tags and keywords; and schedules his video press release to be published on February eat 10:00 am PST/ 1:00 pm EST. Mr. Johnson clicks "Submit"; and clicks "Yes" when asked "Are you Sure".

Mr. Johnson selects the distribution for publication of the video press release and pays for it, completing the transaction. He next receives an email with a digital receipt confirming that his purchase has been received and that his video press release has been scheduled to be published on Monday February eat 10:00 am PST/1:00 pm EST. On Feb. 4, 2013, at 10:00 am PST/1:00 pm EST, he receives an email from SNNWire confirming his VPR has been published and there is a link embedded in the email. A day later, Mr. Johnson receives an email from SNNWire that provides tracking data: (1) how many views his video press release has received; (2) amount of minutes his video has been played; (3) unique page views to his video press release, and (4) a list of the websites which have show his video press release.

Prophetic Example 4

Uploading Business Video Press Release with Non-Apple Product; Making a Video Component Using "Webcam Recording"

Prophetic Example 4 is a modified Example 3. In Example 4, Mr. Johnson makes a video using the "Webcam Recording" capabilities available in the VPR Media Room of the VPR website and using his computer webcam. He logs into his VPR account and he goes to its VPR Media Room where he types in the title of his video press release and clicks "Upload Video". He clicks on "Webcam Recording" and a window pops up displaying a real time video image of him by the webcam of his HP-Pavilion 20" All-In-One Desktop Computer. Mr. Johnson clicks the "Record" Button to start recording a 2-minute video for his video press release. He stops recording the video by clicking the "Record" button a second time. He plays back his video, finds it satisfactory, and clicks finish. He waits until the video is saved in his "Media Library". He then highlights the Video; chooses a thumbnail; and then clicks "Insert into post".

Next Mr. Johnson clicks "Upload Text"; clicks "Choose File"; locates his PDF file of the text Document on his desktop; double clicks on it; and clicks, "Insert into post". When he is done with these two tasks, he previews his business video press release. He is well satisfied with his VPR and proceeds to check the proper category boxes; writes his tags and keywords; and schedules his video press release to be published on February 4th at 10:00 am PST/1:00 pm EST. He clicks "Submit"; and clicks "Yes" when asked "Are you sure". He next moves to select the distribution of his VPR and to pay for its distribution at his Checkout Cart. He receives an email with a digital receipt. His payment has been received and his video press release is scheduled for publication on February 4$^{th}$ at 10:00 am PST/1:00 pm EST. On February 4th at 10:00 am PST/1:00 pm EST, he receives an email from SNNWire confirming his VPR has been published. Embedded in this email is a link to view his VPR. Within 24 hours, Mr. Johnson receives an email from SNNWire with tracking data on his VPR: (1) how many views his video press release has received, (2) the amount of minutes his VPR video has played, (3) unique page views to his VPR and (4) a list of the websites which have shown his VPR Prophetic Example 5

Uploading a Video Press Release: Video Created on a "Tablet Device" without Purchasing Distribution after VPR is Completed LMNO Corporation is a publicly traded, 25 year old mining company listed on the Toronto Stock Exchange, symbol LMN.TO.LMNO's CEO, Mr. Sullivan Keats is a geologist who leases and works mainly in gold mines during the months of July and August each year with his brothers in north-central Alaska. LMNO Corp. has a small business office operation each spring in Vancouver, British Columbia where Ms. Lena Anderson works as the COO of LMNO Corp. She represents LNMO Corp. interests at gold, silver and copper mine leasing auctions, at mining equipment rental/purchase auctions in British Columbia, and at weekly gold investor meetings run by the Big Strike Alaska Mining Bureau in Seattle.

Ms. Anderson learned about video press release from a friend at the Seattle gold investor meetings. She immediately realized VPR can be an instant boost to LMNO Corp. professional look to their mining investors and existing stockholders. They need to know current LMNO mining business ventures. Mr. Keats agrees that LMNO Corp needs more exposure in the business community immediately. He asks Ms. Anderson to create a business video press release ASAP so LMNO Corp. business gets more public exposure.

Ms. Anderson purchases a limited VPR account at the VPR website of the SNNWire Company on June 14$^{th}$ which will pay for three LMNO Corp. business video press releases. Ms. Anderson writes a business text document for the first video press release and emails the text Document to Mr. Keats, CEO of LMNO Corp. up in Barrow, Ak. who studies it, adds his mining financial projections, then emails the text document back to Lena. Mr. Keats is very enthusiastic about the VPR project and as the company Geologist; his additions to the text document are important updates and mining projections in the LMNO business model that he provides. His business model indicates that revenue projections for the current July and August mining period much higher than a month ago. Ms. Anderson saves the revised text document from Keith as a PDF file to be later uploaded to make the business LMNO Corp. business video press release.

On June 20$^{th}$ Ms. Anderson records the business Video for the VPR to support the timely and current information in the text Document about the status of LMNO Corp. gold mining. Ms. Anderson chooses to use the video component on her iPad, and connects her iPad to her MacBook Pro personal computer. She imports the video into iMovie, clicks "Export Movie", and saves an ".m4v" file to her desktop. She reviews the 2-minute Video and thinks she is a good spokesperson who can represent the business to the investment community. She knows they will only listen to a person they trust about the current LMNO business activities, cash flow, mine lease planning and stock investor values.

To make the VPR, Ms. Anderson logs into her VPR account and clicks "Create New VPR". She enters the Headline for LMNO's video press release, uploads the Video from her desktop, chooses her thumbnail, clicks "Insert into post". Ms. Anderson then uploads the text Document, clicks "Insert into post", and previews her video press release at the HTML webpage and is quite satisfied at the VPR product quality given how easy and efficiently it functions. She checks the "Basic Materials", "Gold", "Silver", "Alaska", "Mining", and "Investor" category boxes. She writes in her keywords and tags, and schedules the video press release to be distributed "As Soon As Possible". She clicks "Submit", and next clicks "Yes" to the "Are you sure?" pop-up.

Next, Ms. Anderson is prompted to select where she would like to distribute her video press release. However, she knows LMNO Corp. operates on a tight budget. She knows most of the LNMO investor money is to be used for day-to-day gold mining operational costs. Therefore, she has the LMNO Corp. video press release only published on the VPR website operated by SNNWire. She does not select other venues for distribution of her video press release at this time. She next clicks "Continue to check out", where her balance owed to SNNWire is $0. She clicks "Finish", and receives an email with her digital receipt letting her know when her video press release will be published and that her payment owed is zero dollars.

Almost immediately after receiving her digital receipt, Ms. Anderson receives an email in her inbox notifying her that her video press release has been published, and is available for view. She next clicks the link and watches and reads her video press release. She had viewed the preview at the VPR HTML webpage and liked it, but Ms. Anderson is startled and amazed at how professionally her video press release portrays her in video and how well she speaks about LMNO Corp.

She is delighted and immediately sends an email off to CEO Sullivan Keats with a link to view the video press release ("VPR"). Keith's brothers think the LMNO VPR was very affordable, quick, convincing and truthful. They opine that it is exactly what their mining company needs to connect with its investors so that LMNO Corp. is respected as a proper mining venture. Keith emails her back to thank her. On her own Ms. Anderson emails the LMNO Corp. video press release as a link "embedded" in emails she can distribute at no cost to the company to selected business professionals. She emails 54 professional mining business colleagues; and the 472LMN.TO shareholders using the link embedded VPR publication. The VPR publication instantly reports to them LMNO Corp's the company's current financial plan for July and August and expansion plans for this August. One day later, Ms. Anderson receives tracking data details about who has read the LMNO Corp. business video press release.

Utility of the Present Invention

A purpose of the video press release is to provide a company with a vehicle that can be used by the company for market awareness and investor visibility. Market awareness is the delivery of a concise message to a targeted audience or a general audience. Investor visibility is providing access to all types of investors to become aware of investment ideas, market research, stock or company analysis, information gathering, data comparison, educational materials, and for tracking Market awareness and investor visibility pertains especially to third-parties entities such as public and private companies, regardless of their size. Other third party entity categories are non-profit organizations, real estate, or service providers to name a few. A company would choose to use a video press release to provide market awareness and investor visibility including for some of the following examples: a new product announcement, financial reporting, regulatory compliance, management changes, and SEC filings such as: 10Q, 10K, and 8K. Other examples include: corporate material events or changes, mergers and acquisitions, changes in ticker symbol, new or updated information regarding legal proceedings, future or past attendance at a trade show, conference or road show, new corporate C level hires, any firings or hiring, awards received, new large contracts, newly offered services, any joint ventures, new marketing agreements, strategic alliances, new office openings, corporate expansion, mentions in other person's research, research reports, new share issues, warrant executions, new funding, third party related transactions, lab results, drill results, regulatory approvals, or technology advancements, and any other company information.

The kinds of individuals and types of companies that may need to use the video press release will include the following examples: public companies, private companies, crowd funding companies, professionals including lawyers, CPAs, Investor Relations executives, non-profit companies, event & conference companies, real estate companies, Individuals who would like to make an announcement, and celebrities.

Advantages of the Present Invention

One advantage of creating a video press release in this method of creating a video and written press release publication is that the invention enables a single person (one person) to be the creator and optionally also its user, issuer, distributor, and publisher of a video press release without another human's needed intervention. This is a novel and a non-obvious press release production method compared to the press release industry convention which is to depend upon the work of a plurality of people to create, edit, use, issue distribute, collect payment, and publish press releases. The press release industry uses studio production technologists; people to check for press release communications continuity, and by extensive legal reviews by lawyers. Collectively these commonplace professional activities have expanded press release production times and created publication delays that seem now to appear to be state of the conventional art and unavoidable. To imagine bypassing all this press release red tape, and have one individual quickly and properly create and distribute a highly professional company video press release is not obvious and is an unthinkable invention.

Video press release (VPR) is a timely, efficient production method for its user who also may also act as its publication issuer to a selected population of third party recipients. VPR is capable of immediate and selective distribution. VPR can be immediately reviewed for editing and during review by its creator as it will appear when the VPR is published. The method of creating and using the video press release has novel embodiments due to these capabilities.

Because a single person can create and use a video press release, the practice of this invention by a single company employee such as the CEO is a method for reducing the potential for fraud from leakage of company insider information when multiple individuals are involved with confidential company news prior to its publication.

Another advantage of a video press release is its novel freedom as a method for being able to use one or more of the many different kinds of digital file information technologies being used by different sectors of the population.

The video press release is also a unique way to create efficient fusions of video, sound and written text information for (a) providing immediate and precise, sophisticated business and financial information, and (b) using a stimulating entertaining method employing complex information media.

Video press release creations are "infotainment products" meaning information that may be mundane business data is communicated in a stimulating entertaining complex medium. Due to its infotainment qualities, video press release communications are informative because its audience is viewing and listening to and/or reading the presentation.

Quantitative feedback on the audience receiving a published video press release is achieved because VPR viewership is tracked. Tracking is an important element in determining a return on investment for company budgets. Public opinion and surveys conclude significant numbers of investors reading data has dropped while video viewership has steadily been increasing.

VPR can be easily shared on social networks and other digital media. VPR is easily archived and retrieved. VPR provides investors will an opportunity "to meet" the person representing their company.

The methods, processes, and systems for creating a video press release are novel and non-obvious for several reasons. Currently, if a company needs a video in their text press release, they need to perform many steps using multiple people. First, the video must be hosted on a video hosting platform, such as YouTube or Vimeo, and a link must be "active". Second, the user must upload their text press release, rather than providing the video file. Third, the user must upload a link to the video. Note: a remote human customer service representative may need to contact the user as to whether editing or notes or other changes are required. Fourth, each text document will require the user to give directions for video link placement within their press release. The problem that existed before the video press release invention was the need for a third party to physically copy and paste the link to the user's video into the press release. Furthermore, on the finished HTML web page, the video is sometimes a link to the user's video. In this case a person reading the press release would have to leave the press release page, go to another URL for viewing a video. Another problem before the video press release invention was that the user could not preview their press release prior to its publication. The video press release eliminates the need for a third party because the video press release video component is a user-generated video that does not need to be hosted anywhere else. In fact, for compliancy requirements to be met, it is compliant that the video component remains private until the video press release is published. Secondly, the user will not be contacted by a customer service representative to edit their VPR. The process is done solely by the user, and is verified by the user. SNNWire's custom built HTML web page is automatically populated with a user's video and text components. Thus, no human intervention is required to physically embed any video or any text components onto the HTML web page. This eliminates the possibility of third party human error or illegal fraudulent behavior. Fourthly, the video and text component are automatically converted and formatted to theSNNWire.com HTML web page that was set up using hypertext to set up to do the job of formatting video files with text document files and across all digital platforms. Lastly, a registered user has the ability to preview their video press release and re-record a video or re-upload the correct text document if necessary or accept. In addition, a video press release can appear and can play on the HTML web page that was set up using hypertext to set up to do the job of formatting video files with text document files on SNNWire.

The video press release provides a one-stop shop for video hosting, video creation, and the ability to preview their work, attain mass dissemination, reach targeted distribution, and a platform, which automatically utilizes two modes of communication, text and video. The video press release allows people who do not have time or desire to read a text only release but would, easily watch a short user-generated video explaining and referring to the text document.

The video press release user can create a video to go with their text document. The video press release user can create a video that talks about the press release, rather than being a corporate "overview" video, or "product demonstration" video that has been embedded into the press release. The video press release can automatically format a word document file and a video file onto a HTML web page that was set up using hypertext to set up to do the job of formatting video files with text document files.

The video press release video component can feature a "talking head" who is a company spokesperson to discuss the press release and who may not necessarily require a third party. The video press release is a new medium of information transfer that combines user-generated video and text to deliver a company's message. The video press release is based on user-generated content—both the video and text document. The video press release provides tools for the user to create their own video, and can avoid the costs of having a production crew make a video and avoids dissemination of sensitive information prior to publication of the video press release. The video press release can allow users to read a document while watching and listening to the corresponding video without having to go to a new web page, URL or digital destination. The video press release user is solely responsible for the information he/she may decide to syndicate. The video press release helps adopting users to differentiate their companies from other companies and the video press release provides viewers a company representative associated with the company.

The video press release can provide an engagement platform stylized for viewers and readers to receive video and text messages in a standard "press release" format. The video press release can allow a CEO to bring his or her text press release to life with the inclusion of a user-generated video. The video press release user can preview how their video press release can exactly appear on an HTML web page publishing their video press release. The video press release may in some cases, optionally permit some users to make any changes (edit) their video press release prior to its publication as their video press release. For example, the user can change a video, adjust a text document, edit a headline, and make any other changes, additions, deletions or edits.

TABLE 1

Example Code According to One Illustrative Embodiment

```
$output22 = shell_exec("ffmpeg -i ".$url. " 2>&1 1> /dev/null"); //
        use ffmpeg
to store the video file information a "string format"
        $out_arr = explode("\n", $output22); // convert the file from "string format" to
"array format"
        $rotate = false; // assume that the image does not be rotated 90 degrees, until
proven otherwise
        $rotate180 = false;
// assume that the image does not be rotated 180 degrees, until proven otherwise
        foreach($out_arr as $line) { // this foreach loop traverses each line of the array
and checks for the words 'rotate' and '180', which would imply that the image needs to
be rotated to be viewed appropriately
    if(strpos($line,'rotate')!== false) {
        $rotate = true;
        if(strpos($line,'180') !== false){
          $rotate180 = true;
        }
    }
}
        if($rotate180){ // if the video need; to be rotated 180 degrees, add the necessary
parameters to the final execution code
      $rotateCode = '-vf "transpose=2,transpose=2" ';
}
else if($rotate){ // if the video needs to be rotated 90 degrees, add the necessary
parameters to the final execution code
        $rotateCode = ' -vf "transpose=1,scale=trunc(oh*a/2)*2:480" -metadata:s:v:0
rotate=0 ';
}
else{ // if the video does not need to be rotated, add the necessary parameters to resize
the video without rotating
      $rotateCode = ' -vf "scale=trunc(oh*a/2)*2:480" ';
}
// the if/else logic below checks below check the orginal video file type, and then add
the appropriate encode parameters to convert each specific file type to mp4 (which is
the file type which is acceptod by most browser configurations)
if($ext == 'mp4' || $ext == 'm4v'){
    $encode = ' -preset:v veryfast ';
    $append_s = '_s';
}
else if($ext == 'wmv'){
    $encode = '-c:v libx264 -crf 23 -c:a libfdk_aac -q:a 100 -preset:v veryfast ';
}
else if($ext == 'mov'){
    $encode = ' -threads 0 -strict experimental -f mp4 -vcodec libx264 -vpre ipod640 -b
1200k -acodec aac -ab 160000 -ac 2 -preset:v veryfast ';
}
else if($ext == 'mpg' || $ext == 'mpeg' || $ext == 'm2v'){
    $encode = '-c:v libx264 -c:a libfdk_aac -r 30 -preset:v veryfast -s 640x480';
```

TABLE 1-continued

Example Code According to One Illustrative Embodiment

```
}
else if($ext == 'flv'){
    $encode = '-qscale 0 -ar 22050 -vcodec libx264 -preset:v veryfast ';
}
else if($ext == 'avi'){
    $encode = '-c:v libx264 -crf:v 22 -preset:v veryfast -ac 2 -c:a libfdk_aac -vbr 3 -preset:v veryfast ';
}
else if($ext == '3gp' || $ext == '3g2'){
    $encode = '-q:v 0 -ab 64k -ar 44100 -preset:v veryfast ';
}
// This next line is the code execution which logs the system into the VPS server and
executes the custom configured ffmpeg video encoding. This required a ton of testing
to work correctly and it took many hours of trial and error
            exec("echo Sdwebintegration1! | sudo -S ". $rootPath ." -i ".$url."
".$encode.$rotateCode.' '. $convertedFile.$append_s. ".mp4 2>&1 &> /dev/null &");
```

SOME DEFINITIONS OF TERMS USED IN THE PRESENT INVENTION

These definitions are illustrative, and are not intended to be limiting. Terms may be used in singular, plural, verb, or adjective as necessary within the meaning of the definitions.

A "computer" means for the present invention any device which can make a link with the Internet and which can participate in the embodiments of the present invention. Thus for the future invention for example, a desktop computer, a laptop, a tablet, a smart phone, a Blackberry, an iPhone and the like are computers.

A "first entity" is the manager operator) of the VPR website and to whom the second entity (the VPR user, a VPR creator, a VPR issuer, a VPR publisher) may obtain an account to be able to use the VPR website. Optionally, in practicing the present invention, the first entity may charge a fee for services to the second entity practicing the present VPR invention.

A "second entity" is a user of the VPR website who may create a video press release and maybe the issuer of a VPR. The second entity may choose their own distribution outside the first entity if they choose. The "creator of a business video press release is a "second entity". The Third entity or (third parties) are the recipients of the business video press release issued by the user/creator/issuer (i.e., the second entity). Accordingly the user generated business VPR invention may be a useful method for satisfying a material or a non-material need for an issuer who may be required by law to provide such information to the public or another entity.

An "entity" includes an entity selected from the group consisting of an individual, a plurality of individuals, a business, a company, a charitable foundation, a partnership, a corporation, an advertising company, a trust, a bank, a plurality of businesses, a plurality of companies, a trade group, a lobby group, a politician, a trade union, an industry, a government, a treaty organization, and the like.

A "website" is located by its address which may include for example its address on the Internet, on the World Wide Web, or on the Internet cloud or on like networks that link computers and electronic devices of an entity.

A "secure Internet website" is defined for the present invention as an Internet website blocking an entry and a use of the website to an individual until such time after that individual logins with a username ID and a password. Typically this individual will have established a User Account with the Proprietor of the secure website in order to receive a Username ID and password.

A video press release when played may have a static written text or a moving written text. For the present invention, the term "written text" means a static written text, a moving written text, or a watermark seen on a video press release during a playing of a video press release. For the present invention, a "written text" may be located outside the video or within the video image or on any image of the video press release.

A video press release may be published using any spoken or written language. A video or a written text file or document in any language may be used to create a video press release.

For the video component of the video press release, a person or talking head in the video can be one of the following: C-suite executives: CEO, CFO, COO, CTO, CIO, President, Investor Relations Manager or Director, or a hired company spokesperson. The person who speaks can be anyone as long as they are an employee of the company and/or have been approved by the company to be the representative spokesperson.

There is no limitation of where a video press release can be published (viewed or played) if it is played on a video screen or apparatus, which allows its publication. A video press release can be a marketing tool for companies to disseminate their company messages using at least two different combined modes of communication: for example, video and text. Once the video press release is published, it is published to the Internet and/or digitized for people to interact with the video press release across all Internet platforms. Furthermore, because the video press release contains a video component, cable news networks, television news stations, and videoed radio shows can play the video press release, and broadcast the latest news from the company.

The video press release user has an option to publish their video press release "As Soon as Possible". The user has an option to publish their VPR in "Real-Time" after payment for its distribution. The present invention advantageously does not require the authorization of an outside editor. There is no editor that needs to be called upon to verify, confirm and edit a text release for the customer. The video press release allows a user to create their own video and can embed said video, with a text document, to for example, a HTML web page that was set up using hypertext in order to set up to do the job of formatting video files with text document files. This is preferred over a choice of a photo as a static image to attach with the text document. In the general sense, to embed is to put one thing into another.

"Embeds" or embedded" means in the sense of computer language as embedding, a taking of the fundamental code structure (for instance of an image) and putting it into another code object such as a video. Something embedded into a code structure can be separated from the other code structure, but serves its function better when it is joined to ("or embedded in") the other structure.

The video press release is a combination of a user-generated video with a company approved text document, is completely user-generated, and avoids a third party need to produce a video. A user might create a video press release by a video recording device. The video press release provides the option of webcam recording for the user to create a video for their video press release. The video press release videos do not have to be hosted on a third party video-hosting platform prior to submitting the video press release. The video press release user can create the self-made video on the spot using a webcam recording device. The video press release automatically formats the video component onto an HTML webpage without any other human intervention. HTML is a preferred file format at this time however, other webpage file formats can be substituted for HTML in the present invention and a list of webpage file formats is in the written description of the invention.

Human intervention means people will have access to a video prior to its publication and this will increase the possibility of a human error. Human intervention also means that a user will be either providing video hosting or posting the video to a public video social network prior to publishing a video press release.

CONCLUSIONS

One of ordinary skill in the art knows that the use cases, structures, schematics, and flow diagrams may be performed in other orders or combinations, but the inventive concept of the present invention remains without departing from the broader spirit of the invention. Every embodiment may be unique, and methods/steps may be either shortened or lengthened, overlapped with the other activities, postponed, delayed, and continued after a time gap, such that every user is accommodated to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A user-device is a hardware that includes at least one processor coupled to a memory. The processor may represent one or more processors (e.g., microprocessors), and the memory may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a user-device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

The hardware operates under the control of an operating system, and executes various computer software applications, components, programs, codes, libraries, objects, modules, etc. to perform the personalization techniques described above.

In general, the method executed to implement the embodiments of the invention, may be implemented as part of an operating system or a specific application, component, program, object, module or sequence of instructions referred to as "computer program(s)" or "computer code(s)." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method for creating a business video press release in a webpage of a video press release website, the method comprising:

receiving a business video file having a first file format and a business text document file having a second file format to said webpage of said video press release website;

formatting said business video file along with said business text document file at said webpage of said video press release website, wherein said business video file is juxtaposed adjacent to a business text from the business text document file, wherein said step of formatting combines said business video file having said first file format and said business text document file having said second file format to result in a combination file having a third file format, wherein said combination file having said third file format comprises said business video press release, wherein the business text document file is converted into an HTML text file without formatting errors by removing code that impairs formatting, and by applying custom formatting to create a clean HTML text layout from the business text document file;

providing an interface for previewing said business video press release at said webpage, wherein said business video press release comprises said combination file in said third file format, wherein said combination file comprises said formatted business video file and said business text from said business text document file, wherein said step of formatting and said step of previewing are achieved by using a software transcoder, wherein said software transcoder is adapted for automatically resolving video file format incompatibility issues, wherein said incompatibility issues emerge in at least one of said step of formatting and said step of previewing, wherein said combination file having said third file format comprises the business video file transcoded and resized to assure compatibility with said webpage of said video press release website, thereby transcoding said business video file into a suitable video format for presentation at said webpage, and juxtaposing said transcoded business video file with said business text to present to an Internet audience said transcoded business video file adjacent to said business text, wherein said transcoding comprises a reformatting, a resizing, and modifying a resolution of said business video file, wherein said business video file is selected from a plurality of video file formats, and wherein said incompatibility issues are relevant to at least all of a plurality of web-page formats, a plurality of video playback applications, a plurality of end-user devices, and a plurality of operating systems on said end-user devices;

receiving an instruction from a user to schedule a date, a time, and a time zone of a publication of the business video press release, and a list of distribution locations; and controlling the publication of said business video press release, wherein said business video press release is stored on a server, and wherein said publication is performed at the scheduled date, time, and time zone to the list of distribution locations, thereby setting up a preferred time and a target audience for a distribution of said business video press release.

2. The method of claim 1, wherein said software transcoder has an interface to accept a computer command, wherein said computer command instructs said software transcoder to receive an incompatible video file format and to convert said incompatible video file format into a compatible video file format.

3. The method of claim 1, wherein said software transcoder further comprises a Video Embed & Thumbnail Generator (VETG), wherein the VETG comprises a media library browser plug-in adapted to embed videos, generate thumbnails, and encode HTML-5 compatible files.

4. The method of claim 1, wherein said software transcoder further comprises a modified FFMPEG plug-in, wherein the FFMPEG plug-in is a software module for transcoding a first type of multimedia data format into a second type of multimedia data format, wherein transcoding is specified in a command line or an interface of said FFMPEG plug-in.

5. The method of claim 1, wherein said plurality of video file formats is selected from the group consisting of a MP4, a M4V, a WMV, a MOV, a MPG, a M2V, a FLV, an AVI, a 3G2, an AAF, a 3GP, a GIF, an ASF, an AVCHD, a CAM, a DAT, a DSH, a FLV, a M1V MPEG-1, a M2V MPEG-2, a FLA, a FLR, a SOL, a M4V, a Matroska, a MPEG-4 ASP, a MPEG-4 AVC, a WRAP, a MNG, a PNG, a JPEG, a QTCH, a MPEG, a MPEG-4 Part 14, a MXF, a ROQ, a Ogg, a SVI, and a SWF.

6. The method of claim 1, wherein said transcoding further comprises compressing said business video file.

7. The method of claim 1, wherein only one user is needed to create said business video press release.

8. The method of claim 1, wherein a subject matter of said business video press release is selected from the group consisting of a market awareness, an investor visibility, a new product announcement, a financial reporting, a regulatory compliance, a management change, a SEC filing 10Q, a SEC filing 10K, a SEC filing 8K, a corporate material event, a corporate change, a corporate merger, a corporate acquisition, a legal proceeding, a trade show, a conference, a road show, a new corporate C level hire, a new contract, a newly offered service, a joint venture, a new marketing agreement, a strategic alliance, a new office opening, a corporate expansion, a mention in another person's research report, a research report, a new share issue, a warrant execution, a new funding, a third party related transaction, a clinical trial, a gas well drilling report, an oil well drilling report, a mining report, a regulatory approval, a company announcement, a company update, a company research report, a third party research report, a company investor relation statement, a company public relations statement, an organization announcement, and initial public offering document, a technology advancement, a company-relevant information, and combinations thereof.

9. The method of claim 1, wherein said business video press release has a playback time of between about 5 seconds to about 60 minutes.

10. The method of claim 1, wherein said steps are performed via a portable mobile internet device.

11. The method of claim 1, wherein said steps are performed via cloud computing and a cloud storage, wherein said business video press release is stored in said cloud storage.

12. The method of claim 1, further comprising:
receiving tracking results for the business video press release comprising views, unique views, websites that published the business video press release, and an amount of times that the business video press release has been viewed on said websites.

13. The method of claim 1, further comprising:
creating a plurality of thumbnails for the user to choose from when the user uploads the business video file.

14. The method of claim 1, further comprising:
receiving a headline for the business video press release;
receiving a category indicating where the business video press release can be viewed in a plurality of media rooms; and
receiving a keyword tag from the user to apply to the business video press release.

15. The method of claim 1, wherein the business video press release is automatically syndicated to social media after the business video press release has been published.

16. The method of claim 1, wherein the business text document file is selected from the group consisting of a DOC document, a DOCX document, and a PDF document.

17. A non-transitory, computer-readable storage medium storing executable instructions, which when executed by a processor, causes the processor to perform a process of creating a business video press release in a webpage of a video press release website, the instructions causing the processor to perform the steps of:
- receiving a business video file having a first file format and a business text document file having a second file format to said webpage of said video press release website;
- formatting said business video file along with said business text document file at said webpage of said video press release website, wherein said business video file is juxtaposed adjacent to a business text from the business text document file,
- wherein said step of formatting combines said business video file having said first file format and said business text document file having said second file format to result in a combination file having a third file format, wherein said combination file having said third file format comprises said business video press release, wherein the business text document file format is converted into an HTML text file without formatting errors by removing code that impairs formatting, and by applying custom formatting to create a clean HTML text layout from the business text document file;
- providing an interface for previewing said business video press release at said webpage, wherein said business video press release comprises said combination file in said third file format, wherein said combination file comprises said formatted business video file and said business text from said business text document file,
- wherein said step of formatting and said step of previewing are achieved by using a software transcoder, wherein said software transcoder is adapted for automatically resolving video file format incompatibility issues, wherein said incompatibility issues emerge in at least one of said step of formatting and said step of previewing,
- wherein said combination file having said third file format is transcoded and resized to assure compatibility with said webpage of said video press release website, thereby transcoding said business video file into a suitable video format for presentation at said webpage, and juxtaposing said transcoded business video file with said business text to present to an Internet audience said transcoded business video file adjacent to said business text,
- wherein said transcoding comprises a reformatting, a resizing, and defining a resolution of said business video file,
- wherein said business video file is selected from a plurality of video file formats, and
- wherein said incompatibility issues are relevant to at least all of a plurality of web-page formats, a plurality of video playback applications, and a plurality of operating systems;
- receiving an instruction from a user to schedule a date, a time, and a time zone of a publication of the business video press release, and a list of distribution locations; and
- controlling the publication of said business video press release, wherein said business video press release is stored on a server, and wherein said publication is performed at the scheduled date, time, and time zone to the list of distribution locations, thereby setting up a preferred time and a target audience for a distribution of said business video press release.

18. The computer-readable storage medium of claim 17, wherein said software transcoder has a command line interface to accept a computer command, wherein said computer command instructs said software transcoder to receive an incompatible video file format and to convert said incompatible video file format into a compatible video file format.

19. The computer-readable storage medium of claim 17, wherein said software transcoder further comprises a modified Video Embed & Thumbnail Generator (VETG), wherein the VETG comprises a media library browser plug-in adapted to embed videos, generate thumbnails, and encode HTML-5 compatible files.

20. The computer-readable storage medium of claim 17, wherein said software transcoder further comprises a modified FFMPEG plug-in, wherein a FFMPEG plug-in is a software module for transcoding a first type of multimedia data format into a second type of multimedia data format, wherein transcoding is specified in a command line or an interface of said software module.

* * * * *